United States Patent [19]

Kobayashi

[11] Patent Number: 5,541,906
[45] Date of Patent: Jul. 30, 1996

[54] OPTICAL HEAD FOR MAGNETO-OPTICAL RECORD MEDIUM

[75] Inventor: Shohei Kobayashi, Hachioji, Japan

[73] Assignee: Olympus Optical Co., Ltd., Tokyo, Japan

[21] Appl. No.: 508,902

[22] Filed: Jul. 28, 1995

[30] Foreign Application Priority Data

Jul. 29, 1994 [JP] Japan .................................. 6-178730
Aug. 17, 1994 [JP] Japan .................................. 6-193298

[51] Int. Cl.⁶ ............................................... G11B 7/00
[52] U.S. Cl. ....................... 369/112; 369/110; 369/44.23
[58] Field of Search ................................. 369/112, 109, 369/110, 100, 105, 44.23; 359/280, 290, 246, 256

[56] References Cited

U.S. PATENT DOCUMENTS

| | | | |
|---|---|---|---|
| 4,771,414 | 9/1988 | Yoshimatsu | 369/110 |
| 5,077,723 | 12/1991 | Yoshimatsu | 369/110 |
| 5,189,655 | 2/1993 | Ogata et al. | 369/44.23 |
| 5,272,685 | 12/1993 | Ando | 369/110 |
| 5,293,371 | 3/1994 | Koyama | 369/110 |
| 5,293,569 | 3/1994 | Koyama | 369/112 |

FOREIGN PATENT DOCUMENTS 63-161541 7/1988 Japan.
5-22974B2 3/1993 Japan.
5-334760A 12/1993 Japan.

OTHER PUBLICATIONS

Ose, et al, "Optical Engineering Handbook", pp. 306–328, 1988.

*Primary Examiner*—Loha Ben
*Attorney, Agent, or Firm*—Watson Cole Stevens & Davis, P.L.L.C.

[57] ABSTRACT

An optical head for reading and/or writing information from and/or from a magneto-optical record medium including a semiconductor laser, a composite prism having a glass prism, a birefringent prism and a dielectric multilayer film interposed between the glass prism and birefringent prism, an objective lens and fist and second photodetectors. A laser beam emitted by the semiconductor laser impinging upon the glass prims is reflected by the dielectric film and is projected onto the record medium by the objective lens. A return beam reflected by the record medium is incident upon the dielectric film via the objective lens, and a part of the return beam transmitted through the dielectric film is separated by the birefringent prism into a first ordinary beam and a second extraordinary beam which are received by the first and second photodectors, respectively. The glass prism and birefringent prism are made of materials which satisfy a condition that a difference between refractive indices of the birefringent prism for ordinary light and extraordinary light is not less than 0.03 and a difference between a refractive index of the glass prism and at least one of the refractive indices of the birefringent prism is not less than 0.15.

31 Claims, 23 Drawing Sheets

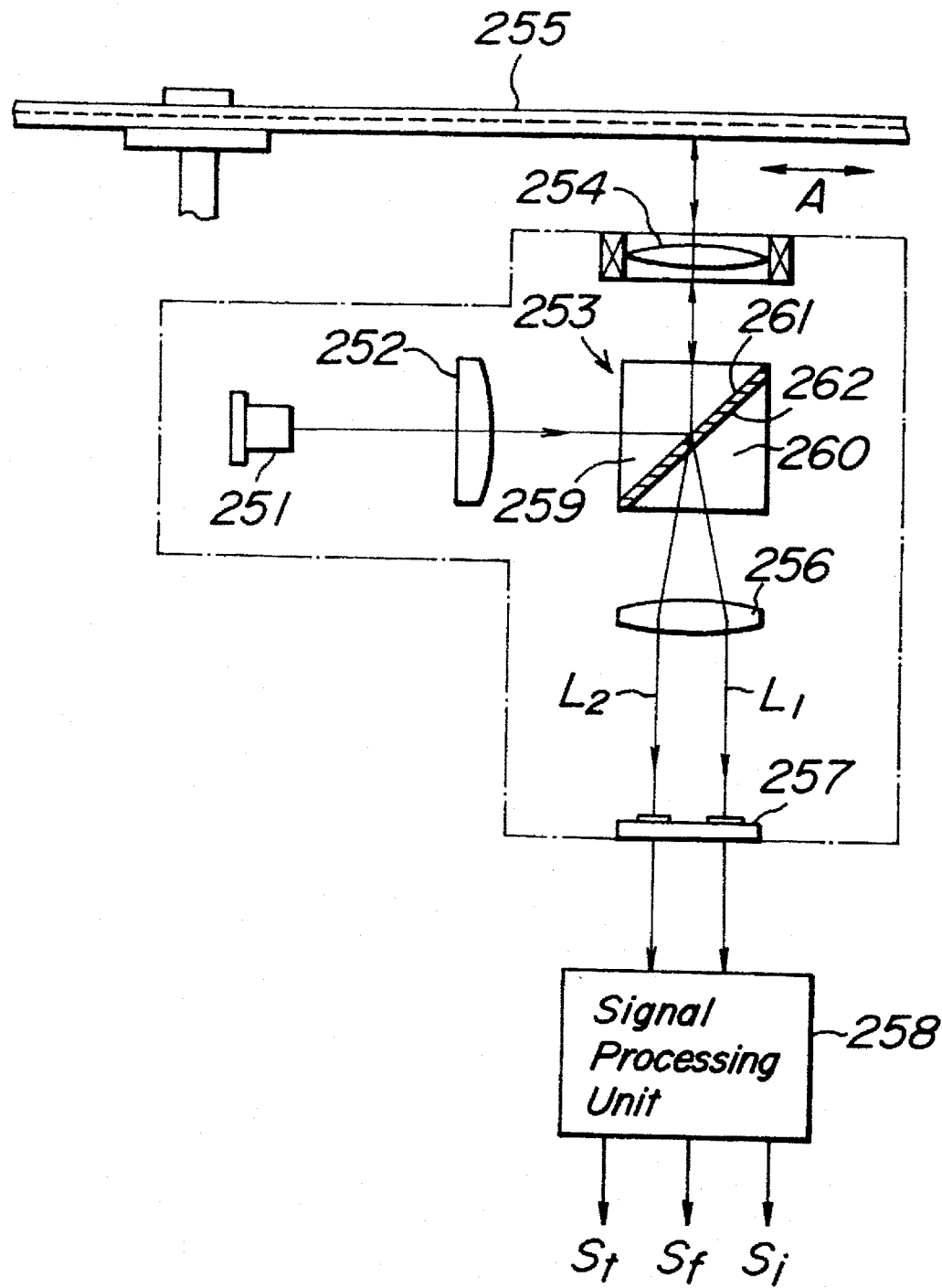

FIG_2
PRIOR ART
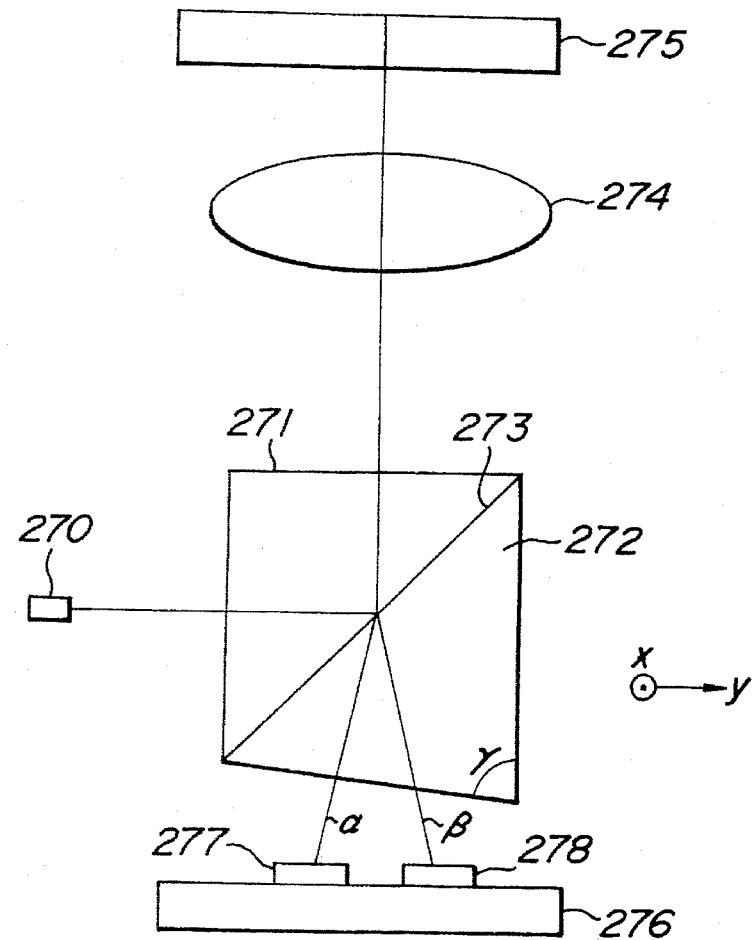
FIG_3A
PRIOR ART
FIG_3B
PRIOR ART
10μm

FIG_4
PRIOR ART
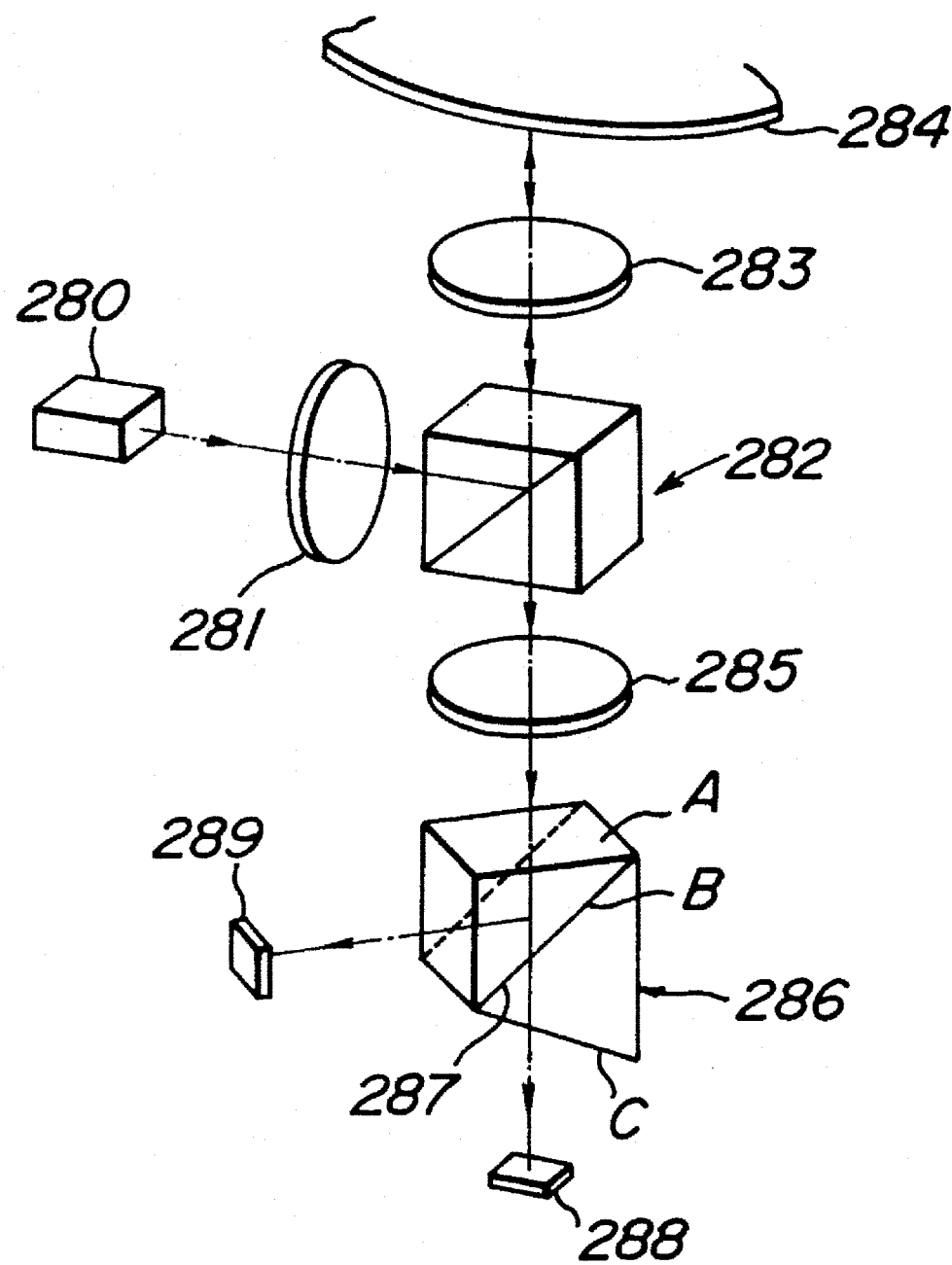

25μm

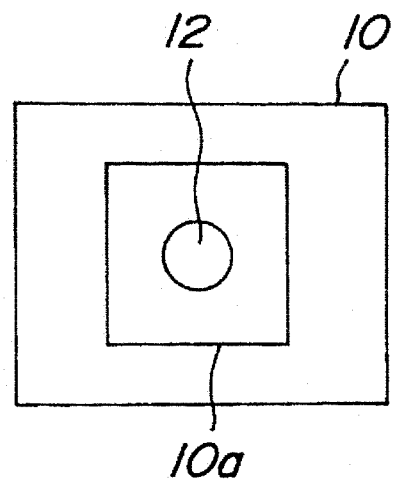
FIG_8A
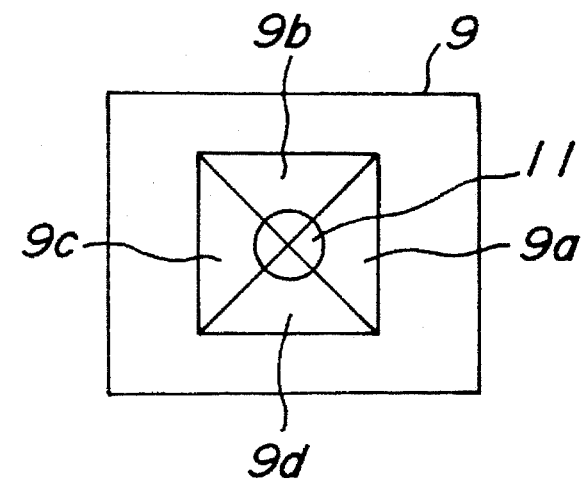
FIG_8B

FIG_11

FIG_14
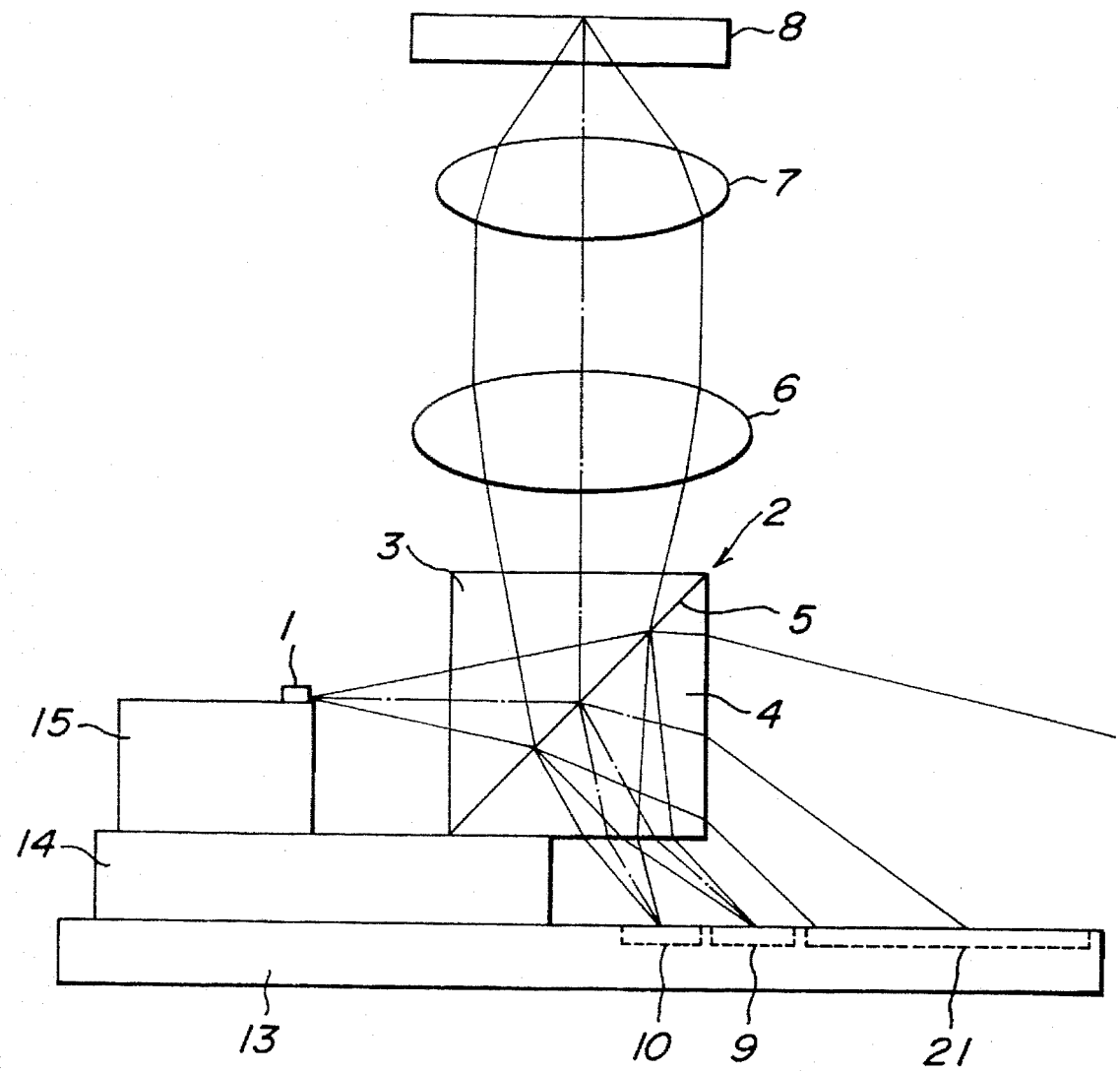

FIG_15
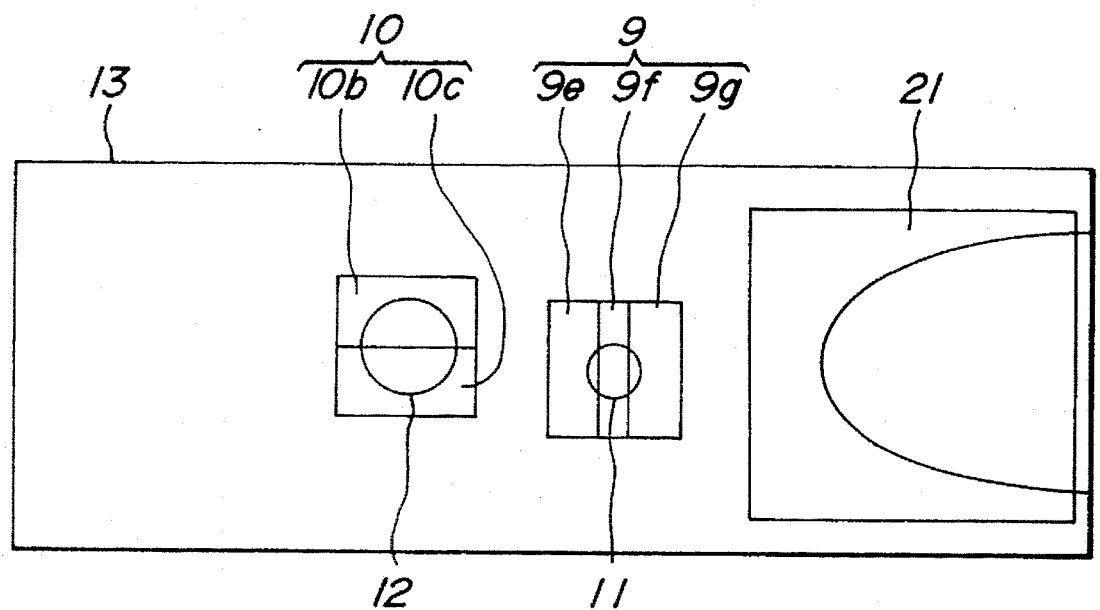
FIG_16
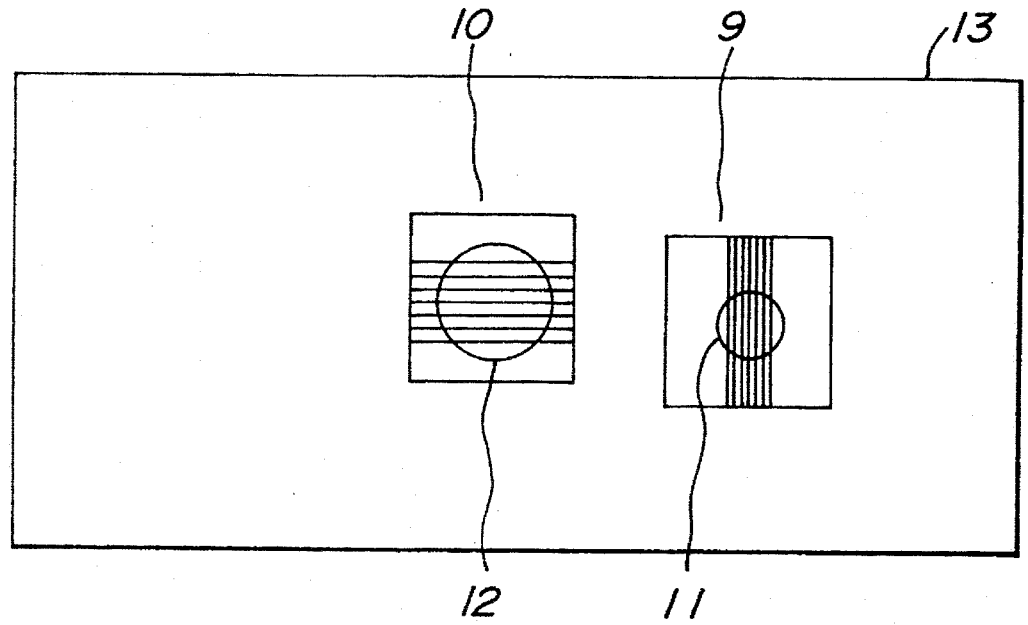

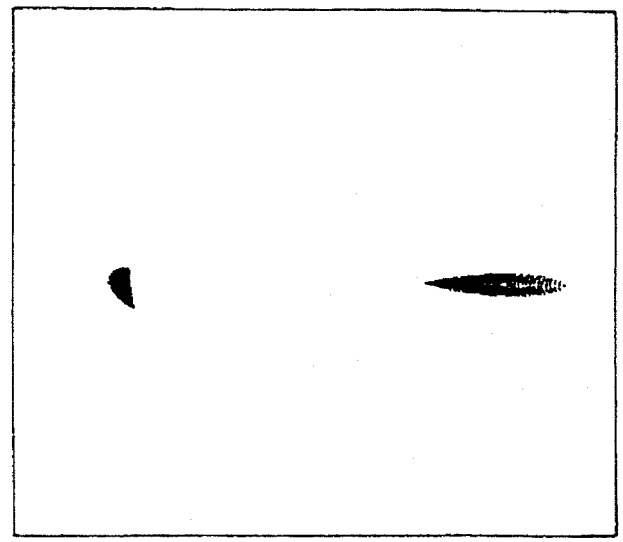
FIG_19A
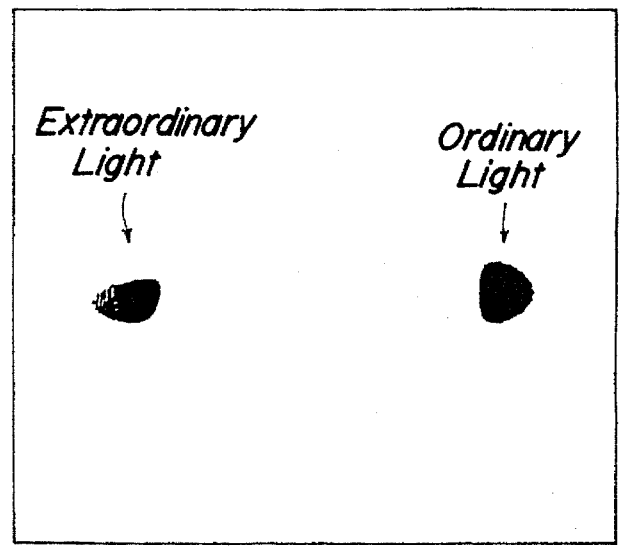
FIG_19B
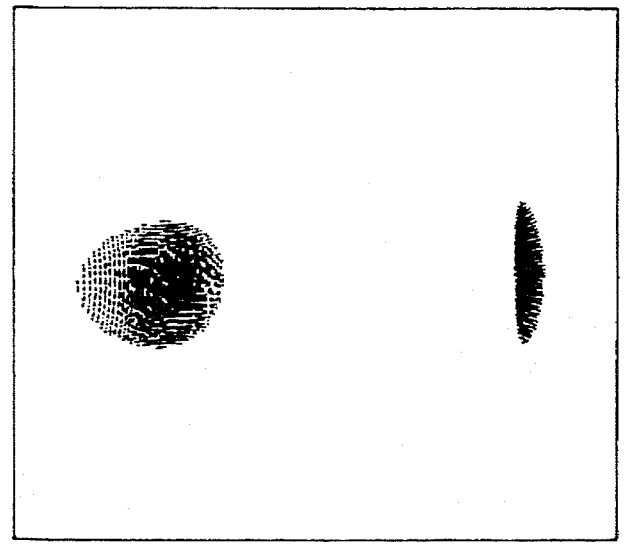
FIG_19C

FIG_21

FIG_22

FIG_24

FIG_26
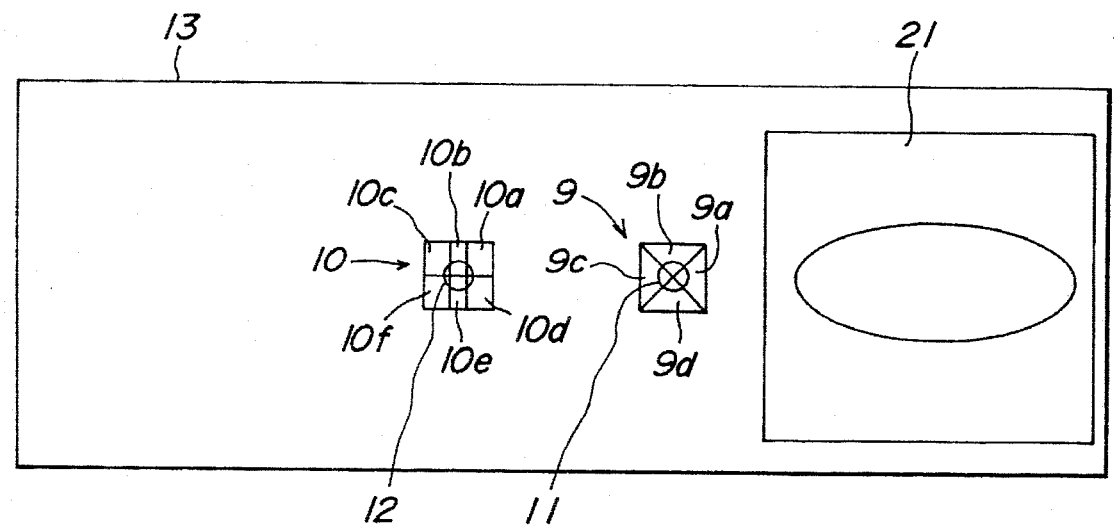
FIG_27
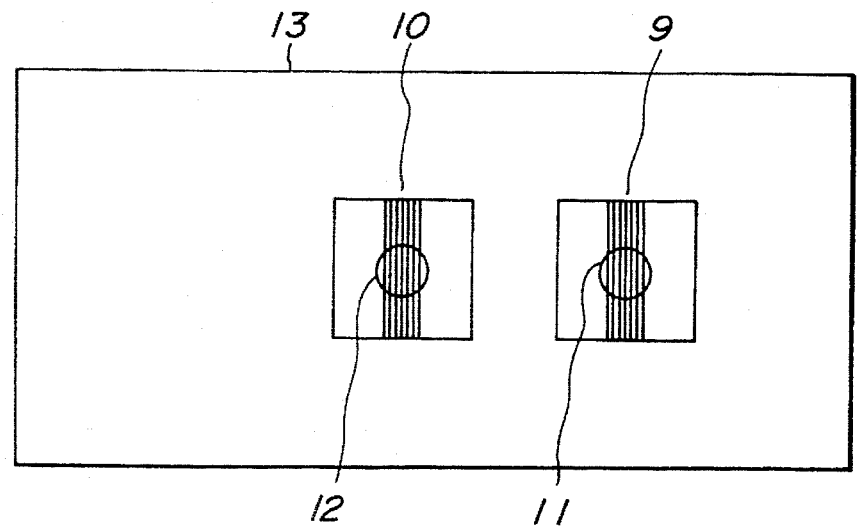

OPTICAL HEAD FOR MAGNETO-OPTICAL RECORD MEDIUM

BACKGROUND OF THE INVENTION

1. Field of the Invention

The present invention relates to an optical head for recording and/or reading information on and/or from a magneto-optical record medium.

2. Related Art Statement

In an optical head for recording and/or reading information on and/or from a magneto-optical record medium, a linearly polarized laser beam emitted by a semiconductor laser is made incident upon the magneto-optical record medium as a fine spot by means of an objective lens, a return beam reflected by the magneto-optical record medium is separated into two beams polarized in orthogonal directions, and these two return beams are received by photodetectors. By suitably processing output signals from these photodetectors, an information signal, a focusing error signal and a tracking error signal are derived. The later error signals are required for correcting a relative positional deviation between the objective lens and the magneto-optical record medium.

In Japanese Patent Application Laid-open Publication Kokai Sho 63-161541, there is proposed a known optical head, in which the return beam reflected by the magneto-optical record medium is divided into the two orthogonally polarized beams by using a composite prism element and the information signal, focusing error signal and tracking error signal are derived by the output signals produced from the photodetectors receiving the two beams.

FIG. 1 shows a construction of the known optical head disclosed in the above mentioned Kokai Sho 63-161541. In this optical head, a linearly polarized laser beam emitted by a semiconductor laser 251 is made incident upon a composite prism element 253 by means of a collimator lens 252. The laser beam reflected by the composite prism element 253 is projected onto a magneto-optical record disk 255 by means of an objective lens 254. A return laser beam reflected by the magneto-optical disk 255 is made incident upon the composite prism element 253 by means of the objective lens 254 and is divided into a first beam $L_1$ and a second beam $L_2$ whose polarizing directions are orthogonal to each other. The first beam $L_1$ is called a P-polarized beam and the second beam $L_2$ is called an S-polarized beam. These beams $L_1$ and $L_2$ are made incident upon a photodetecting unit 257 by means of a common converging lens 256 and are received by respective photodetectors. Output signals from the photodetecting unit 257 are supplied to a signal processing unit 258 and are processed thereby to derive information signal $S_i$, focusing error signal $S_f$ and tracking error signal $S_t$.

The composite prism element 253 includes a glass prism 259, a quartz prism 260 and a dielectric multilayer film 261 provided on a surface of the glass prism by evaporation, the quartz prism and dielectric multilayer film being cemented to each other by means of an adhesive layer 262 provided on a surface of the quartz prism.

The optical head shown in FIG. 1 will be further explained in detail. In the above mentioned publication, the function of the composite prism element has been explained as follows: The laser beam emitted by the semiconductor laser 251 is converted into a parallel beam by the collimator lens 252 and is made incident upon the glass prism 260 of the composite prism element 253 as S-polarized beam. Then the S-polarized beam is reflected by the dielectric multilayer film 261 and exits from the glass prism 259. The return beam reflected by the magneto-optical disk 255 is made incident upon the glass prism 259 of the composite prism element 253 and is transmitted through the dielectric multilayer film 261, so that the return beam is made incident upon the quartz prism 260 as P-polarized beam.

In the above Publication, there is further explained that from the P-polarized return beam being incident upon the dielectric multilayer film 261, the first beam of the P-polarized component is obtained to have an optical axis Ie which is inclined by θe with respect to a normal line to the boundary plane, i.e. the dielectric multilayer film 261 viewed in a plane y (which contains an optical axis of the incident beam and an optical axis of the return beam, so that the plane y is parallel with the P-polarized plane) and similarly the second beam of the S-polarized beam is obtained to have an optical axis Io which is inclined by θo (θo>θe) with respect to the normal line to the boundary plane viewed in the plane y.

The first P-polarized beam $L_1$ and second S-polarized beam $L_2$ are made incident upon respective light receiving element groups of the photodetecting unit 257 by means of the common converging lens 256. By comparing the output signals derived from the first and second beams $L_1$ and $L_2$, a rotation of the polarizing plane of the laser beam caused by a vertical magnetizing film of the magneto-optical disk 255 can be detected. In this manner, the information signal $S_i$ can be reproduced.

A change of the return beam due to a tracking servo control pit arrangement on the magneto-optical record disk 255 is detected to derive the tracking error signal $S_t$, and a shape of the beam spot on the photodetecting unit 257 is detected to derive the focusing error signal $S_f$.

As described in the above mentioned Publication, it is assumed that output signals from four light receiving regions of the photodetector receiving the first beam $L_1$ are denoted as Ra, Rb, Rc and Rd and output signals from four light receiving regions of the second photodetector receiving the second beam $L_2$ are represented by Re, Rf, Rg and Rh. Then, the focusing error signal $S_f$ is expressed by [(Ra+Rd)−(Rb+Rc)]+[(Rc+Rh)−(Rf+Rg)].

As explained above, in the known optical head shown in FIG. 1, the laser beam emitted by the semiconductor laser 251 is converted into the parallel beam by means of the collimator lens 252 and the parallel beam is made incident upon the glass prism 259 as the S-polarized beam. Then, the optical axis of the incident beam is changed by the dielectric multilayer film 261 and exits from the glass prism 259. The return beam reflected by the magneto-optical disk 255 is made incident upon the glass prims 259 and the P-polarized component transmitted through the dielectric multilayer film 261 is made incident upon the quartz prism 260.

In the above Publication, there is not explained at all why the S-polarized beam is changed into the P-polarized beam in the return beam. When the linearly polarized beam is made incident upon the vertically magnetizing film of the magneto-optical record disk 255, the polarizing direction of the beam is rotated or modulated in accordance with the magnetizing pattern related to the information. However, this rotation angle is very small such as about ±1°, so that the S-polarized beam could not be changed into the P-polarized beam. It should be noted that the polarizing direction of the S-polarized beam differs from that of the P-polarized beam by 90°. Such a large rotation angle of the polarizing direction could not be obtained by the Kerr rotation.

Now a correct operation of the known optical head illustrated in FIG. 1 will be analyzed. The polarizing direction of the S-polarized return beam reflected by the magneto-optical record disk 255 is rotated by $\pm\theta_k$ ($\theta_k \cong 1°$). Therefore, the return beam contains both the S-polarized component and P-polarized component, an amount of the S-polarized component is much larger than that of the P-polarized component. In this case, the information can be reproduced by detecting in which direction $+\theta_k$ or $-\theta_k$ the polarization plane is rotated.

In the above mentioned Publication, there is explained that in the known optical head shown in FIG. 1, from the P-polarized return beam, the first P-polarized beam is obtained to have the optical axis Ie which is inclined by $\theta$e with respect to the normal line to the boundary plane viewed in the plane y (parallel with the P-polarized plane) and the second S-polarized beam is obtained to have the optical axis which is inclined by $\theta$o ($\theta$o>$\theta$e) with respect to the normal line to the boundary plane viewed in the plane y. It could not be understood why the S-polarized beam can be obtained from the incident P-polarized beam. If this explanation is correct, the S-polarized component and P-polarized component of the return beam is separated from each other, and thus importance information about the direction of the rotation of the polarizing plane is completely lost. That is, it could not be detected in which direction $+\theta_k$ or $-\theta_k$ the polarizing plane has been rotated. Therefore, it is impossible to reproduce the information by comparing the output signals from the first and second photodetectors.

Moreover, in general, when the S-polarized beam and P-polarized beam are made incident upon the quartz prism 260, each of these beams is separated into the ordinary light and extraordinary light. The quartz prism 260 has different refractive indices for the ordinary light and extraordinary light. Therefore, it is practically impossible to combine the P-polarized component into the first beam $L_1$ and to combine the S-polarized component into the second beam $L_2$. Furthermore, both of the optical axes Ie and Io of the first and second beams could not be on the plane y.

In the above Publication, there is described that the focusing error signal Sf is derived from [(Ra+Rd)−(Rb+Rc)]+[(Rc+Rh)−(Rf+Rg)]. It is apparent that the fifth term Rc is not correct and should be amended into Re. Nevertheless it is questionable how to obtain the focusing error signal from the above equation. This equation corresponds to a well known equation for deriving the focusing error signal by the astigmatism method. However, in the Publication there is not explained at all how to introduce the astigmatism.

In FIG. 4 of the above Publication, there is shown the photodetecting unit having the first and second photodetectors each comprising the four light receiving regions. In this FIG. 4, a center of the four light receiving regions of each of the two photodetectors are shown to be positioned on the plane y. However, as stated above, both of the optical axes Ie and Io of the first and second beams $L_1$ and $L_2$ could not be positioned on the same plane y, both the optical axes Ie and Io could not be positioned on the plane y.

In the known optical head shown in FIG. 1, the tracking error signal St is derived by utilizing the tracking servo control point array provided on the magneto-optical record disk 255. However, this method is unusual and thus could not be applied to general magneto-optical record disk.

As explained above in detail, the known optical head described in the Japanese Patent Application Laid-open Publication Kokai Sho 63-161541 could not be used as a practical optical head or could be used only with difficulty.

In Japanese Patent Application Laid-open Publication Kokai Hei 5-334760, there is disclosed another known optical head having a similar construction as that of the above mentioned known optical head illustrated in FIG. 1. FIG. 2 is a schematic view depicting a simplified construction of the known optical head described in the Kokai Hei 5-334760. A linearly polarized laser beam emitted by a semiconductor laser 270 is made incident upon a first prism 271 and is reflected by a polarizing film 273. An optical axis of the incident beam is then changed and the laser beam is made incident upon a magneto-optical record disk 275 by means of an objective lens 274 as a fine spot.

The return laser beam reflected by the magneto-optical record disk 275 is made incident upon the polarizing film 273 by means of the objective lens 274 and first prism 271. The return beam is separated from the incident beam and is made incident upon a second prism 272 by the polarizing film 273. Then, the return beam is divided into an ordinary light $\alpha$ and an extraordinary light $\beta$. The ordinary light and extraordinary light emanating from second prism 272 are received by first and second photodetectors 277 and 278, respectively arranged on a substrate 276 which is in parallel with an exit surface of the second prism 272.

The first prism 272 is made of a glass material BK-7 having a refractive index of 1.51 and the second prism 272 is made of a quartz whose refractive index for the ordinary light is 1.54 and whose refractive index for the extraordinary light is 1.55. An optic axis of the quartz of the second prism 272 is set to be inclined by 45° with respect to a plane x-y. The polarizing film 273 has a transmissivity of 100% for the P-polarized component and a transmissivity of 20% for the S-polarized component. Therefore, 80% of the S-polarized component is reflected by the polarizing film. For the time being, it is assumed that an apex angle $\gamma$ of the second prism 272 is set to 90°. In this known optical head, the information signal is reproduced by the differential method, the tracking error signal is derived by the push-pull method, and the focusing error signal is detected by the astigmatism method.

In FIG. 2, an angle between the ordinary light $\alpha$ and the extraordinary light $\beta$ becomes 0.56°. Then, spot diagrams of these ordinary light and extraordinary light on the photodetectors 277 and 278 become as shown in FIGS. 3A and 3B. As can be understood from FIGS. 3A and 3B, size of the spots of the ordinary light $\alpha$ and extraordinary light $\beta$ on the photodetectors becomes very small such as about 10 μm. In FIGS. 3A and 3B, a length of respective sides of the assembly of the first and second prisms 271 and 272 is 3 mm, a distance between the exit surface of the second prism 272 and the photodetectors 277 and 278 is about 1.8 mm, and a light receiving plane of the first photodetector 277 receiving the ordinary light $\alpha$ is set at such a position at which the best focused image is formed.

It is practically impossible to receive the above spots by the photodetectors 277 and 278 each having four light receiving regions, because in general the light receiving regions are separated from each other by light insensitive regions having a width of about 10 μm. Therefore, it is almost impossible to derive the focusing error signal. If the focusing error signal is obtained, an inclination of the focus error signal having a substantially S-shape becomes extremely steep near an in-focused position, i.e. a zero cross point, so that the focusing control could not be performed.

In the Publication of Kokai Hei 5-334760, there is explained that by setting the apex angle $\gamma$ of the second prism 272 smaller than 90°, a separation angle between the ordinary light $\alpha$ and the extraordinary angle $\beta$ can be enhanced and the astigmatism is increased. When the apex angle is set to be smaller than 90°, the exit surface of the second prism 272 is inclined with respect to the direction y, so that the astigmatism is increased and the separation angle between the ordinary light and the extraordinary light is also increased. Therefore, a size of the spot is increased and there is a possibility that the focusing error signal can be derived. However, a machining of the second prism 272 becomes very difficult and the ordinary light and extraordinary light might not be separated from each other due to an increase in the astigmatism.

In the Publication of Kokai Hei 5-334760, there is further stated that by using a concave lens in addition to the setting of the apex angle γ smaller than 90°, it is possible to enlarge the separation angle between the ordinary light α and the extraordinary light β. However, in this case a whole size of the optical head is liable to be increased due to the concave lens although the focusing error signal could be obtained. Moreover, by inclining the exit surface of the second prism 272, not only the astigmatism, but also the coma are introduced, so that it is rather difficult to derive the focusing error signal precisely.

In Japanese Patent Application Laid-open Publication Kokai Hei 5-22974, there is proposed another known optical head. In this known optical head, a laser beam emitted by a semiconductor laser 280 is made incident upon a half beam splitter 282 by means of a lens 281 and a beam reflected by a reflection surface of the half beam splitter is projected onto a magneto-optical record disk 284 by means of an objective lens 283 as a fine spot. A return laser beam reflected by the magneto-optical record disk 284 is made incident upon the half beam splitter 282 by means of the objective lens 283. A return beam transmitted through the half beam splitter 283 is made incident upon an optical element 286 by means of a lens 285.

The optical element 286 comprises first and second prisms made of optical materials having different refractive indices n1 and n2, and a polarizing film 297 provided at a boundary surface B. It should be noted that an entrance surface A of the optical element 286 is not parallel with an exit surface C. The optical element 286 is arranged such that the entrance surface A is perpendicular to an optical axis of an incident light beam and is inclined by 45° with respect to the polarizing plane of the laser beam. Therefore, the return laser beam reflected by the magneto-optical record disk 284 is separated into a first beam transmitted through the polarizing film 287 and a second beam reflected by the polarizing film. Then, the first and second beams are made incident upon first and second photodetectors 288 and 289, respectively.

An information signal is derived from a difference between output signals from the first and second photodetectors 288 and 289 by the differential method. A focusing error signal is obtained from the output signals of first photodetector 288 by the astigmatic method. In order to obtain the focusing error signal correctly, a shape of the spots of the first and second beams on the first and second photodetectors 288 and 289, respectively has to be made ideal. To this end, the entrance surface A and the exit surface C of the optical element 286 are inclined each other so that the astigmatism is introduced only for the return beam and an introduction of the coma is suppressed.

In the known optical head illustrated in FIG. 4, the return beam reflected by the magneto-optical record disk 284 is separated into the first beam transmitted through the polarizing film 287 and the second beam reflected by the polarizing film 287, and these first and second beams are received by the first and second photodetectors 288 and 289, respectively. Therefore, the first and second photodetectors 288 and 289 are arranged to be separated from each other, and thus the optical head is liable to be large in size. Moreover, in order to obtain an ideal beam spot on the first photodetector 288, it is necessary to increase a distance P from a point at which a principal light ray of the incident light beam to the optical element 286 is made incident upon the polarizing film 287 to a point at which an imaginary focus point at which the light beam emanating from the exit surface C of the optical element 286 is converged. Said distance P should be nearly equal to 34 mm. Therefore, a size of the optical head is increased.

It may be considered that the coma may be corrected by utilizing the construction of the optical element 286 in the optical head shown in FIG. 2. However, such an application is practically very difficult due to the following reason. In the optical head illustrated in FIG. 4, it is essential that the refractive indices n1 and n2 of the first and second prisms of the optical elements differ from each other as can be understood from an equation described in the above mentioned Publication Kokai Hei 5-22974. The second prism 272 of the optical head shown in FIG. 2 is made of an anisotropic material having different refractive indices for the ordinary light and extraordinary light. Further, the refractive index for the extraordinary light varies in accordance with its propagating direction. Therefore, in the optical head shown in FIG. 2, the above mentioned equation described in the Publication Kokai Hei 5-22974 could not be satisfied.

SUMMARY OF THE INVENTION

The present invention has for its object to provide a novel and useful optical head for a magneto-optical record medium, in which information signal and focusing error signal can be derived precisely, while a size of the optical head can be made small.

It is another object of the invention to provide an optical head for a magneto-optical record medium, in which a return beam reflected by the record medium can be separated from each other by a sufficiently large angle, while a composite prism for performing the above beam separation can be manufactured easily.

It is another object of the invention to provide an optical head for a magneto-optical record medium, in which a return beam reflected by the record medium is separated into ordinary light and extraordinary light, in the ordinary light the astigmatism is increased while the coma is suppressed and in the extraordinary light both the astigmatism and coma are suppressed.

According to a first aspect of the invention, an optical head for a magneto-optical record medium comprises:

a semiconductor laser emitting a laser beam;

a composite prism including a glass prism, a birefringent prism and a dielectric multilayer film interposed between said glass prism and birefringent prism, said laser beam emitted by the semiconductor laser being made incident upon said glass prism and being reflected by said dielectric multilayer film;

a converging means for projecting said laser beam reflected by said dielectric multilayer film and emanating from said glass prism onto a magneto-optical record medium as a fine spot and directing a return laser beam reflected by said magneto-optical record medium to said glass prism of the composite prism as a converging beam, at least a part of the return beam impinging upon the composite prism being transmitted through said dielectric multilayer film and being made incident upon said birefringent prism in which the return beam is separated into a first ordinary beam and a second extraordinary beam;

first and second photodetectors receiving said first ordinary beam and second extraordinary beam, respectively emanating from said birefringent prism to derive output signals from which information signal, focusing error signal and tracking error signal are derived;

wherein said composite prism is constructed such that a difference between refractive indices of said birefringent prism for ordinary light and extraordinary light is not less than 0.03 and a difference between a refractive index of said glass prism and a refractive index of the birefringent prism for at least one of ordinary light and extraordinary light is not less than 0.15.

In a preferable embodiment of the optical head according to the first aspect of the invention, said first and second photodetectors are arranged such that a cross sectional area of the first ordinary beam on said first photodetector is different from that of the second extraordinary beam on said second photodetector, the focusing error signal is derived by processing output signals from one of the first and second photodetectors which receives one of the first and second beams having a smaller cross sectional area, and the tracking error signal is derived by processing output signals from the other photodetector. In this embodiment, a position of one of the first and second photodetectors can be preferably adjusted by using one of the first and second beams having a larger cross sectional area.

In another preferable embodiment of the optical head according to the first aspect of the invention, a diffraction element is arranged between the semi-conductor laser and the composite prism for dividing the laser beam emitted by the semiconductor laser into a single main beam and two sub-beams, sub-beam receiving regions are provided in at least one of the first and second photodetectors, said main beam and two sub-beams are projected onto the magneto-optical record medium such that on the record medium spots of these beams are aligned on a line which is inclined by a given angle with respect to a track direction in which information tracks extend, and the tracking error signal is derived by processing output signals from said sub-beam receiving regions. Then, the tracking error signal can be obtained stably.

In this embodiment, it is preferable to set optical axes of the two sub-beams on a plane which is obtained by rotating a plane including a normal line to the dielectric multilayer film interposed between said glass prism and the birefringent prism and an optical axis of said main beam by 30°–90° about the optical axis of the main beam. Then, undesired interference between the sub-beams and the first and second beams of the return main beam can be avoided.

In another preferable embodiment of the optical head according to the first aspect of the invention, a third photodetector is provided for receiving a part of the incident laser beam which is made incident upon the glass prism, transmitted through the dielectric multilayer film and emanating from the birefringent prism. Then, an output power of the semiconductor laser can be controlled in accordance with an output signal from said third photodetector.

Further, it is preferable to form said first and second photodetectors or said first, second and third photodetectors on one and the same semiconductor substrate. Then, the number of parts of the optical head can be decreased, so that the optical head can be less expensive.

According to a second aspect of the invention, an optical head for a magneto-optical record medium comprises:

a semiconductor laser emitting a laser beam;

a composite prism including a glass prism, a birefringent prism and a dielectric multilayer film interposed between said glass prism and birefringent prism, said laser beam emitted by the semiconductor laser being made incident upon said glass prism and being reflected by said dielectric multilayer film;

a converging means for projecting said laser beam reflected by said dielectric multilayer film and emanating from said glass prism onto a magneto-optical record medium as a fine spot and directing a return laser beam reflected by said magneto-optical record medium to said glass prism of the composite prism as a converging beam, at least a part of the return beam impinging upon the composite prism being transmitted through said dielectric multilayer film and being made incident upon said birefringent prism in which the return beam is separated into a first ordinary beam and a second extraordinary beam;

first and second photodetectors receiving said first ordinary beam and second extraordinary beam, respectively emanating from said birefringent prism to derive output signals from which information signal, focusing error signal and tracking error signal are derived; and an aberration controlling means for increasing astigmatism and decreasing coma introduced in the first ordinary beam and decreasing both astigmatism and coma introduced in the second extraordinary beam.

In a preferable embodiment of the optical head according to the second aspect of the invention, said aberration controlling means is constructed such that a cross sectional area of the first ordinary beam on said first photodetector is substantially equal to that of the second extraordinary beam on said second photodetector. Then, a magnitude of the information signal can be increased, and noise and focus off set in the focusing error signal due to an assembling error can be reduced.

In another preferable embodiment of the optical head according to the second aspect of the invention, a diffraction element is arranged between the semiconductor laser and the composite prism for dividing the laser beam emitted by the semiconductor laser into a single main beam and two sub-beams, sub-beam receiving regions are provided in at least one of the first and second photodetectors, said main beam and two sub-beams are projected onto the magneto-optical record medium such that on the record medium spots of these beams are aligned on a line which is inclined by a given angle with respect to a track direction in which information tracks extend, and the tracking error signal is derived by processing output signals from said sub-beam receiving regions. Then, the tracking error signal can be obtained stably.

In another preferable embodiment of the optical head according to the second aspect of the invention, a third photodetector is provided for receiving a part of the incident laser beam which is made incident upon the glass prism, transmitted through the dielectric multilayer film and emanating from the birefringent prism. Then, an output power of the semiconductor laser can be controlled by processing an output signal of said third photodetector.

Further, it is preferable to form said first and second photodetectors or said first, second and third photodetectors on one and the same semiconductor substrate. Then, the number of parts of the optical head can be decreased and the optical head can be cheap.

BRIEF DESCRIPTION OF THE DRAWINGS

FIG. 1 is a schematic view showing a known optical head;

FIG. 2 is a schematic view illustrating another known optical head;

FIGS. 3A and 3B are schematic views representing spot patterns in the optical head shown in FIG. 2;

FIG. 4 is a schematic view depicting another known optical head;

FIGS. 8A and 8B are plan views showing photodetectors of the optical head shown in FIG. 7;

FIG. 14 is a schematic view representing a sixth embodiment of the optical head according to the invention;

FIG. 15 is a plan view showing photodetectors of the sixth embodiment;

FIG. 16 is a plan view illustrating a modification of first and second photodetectors;

FIGS. 19A, 19B and 19C are schematic views depicting spot diagrams in the seventh embodiment;

FIG. 26 is a plan view showing photodetectors of the eleventh embodiment; and

FIG. 27 is a plan view illustrating a modification of first and second photodetectors.

DESCRIPTION OF THE PREFERRED EMBODIMENTS

Figure 5:
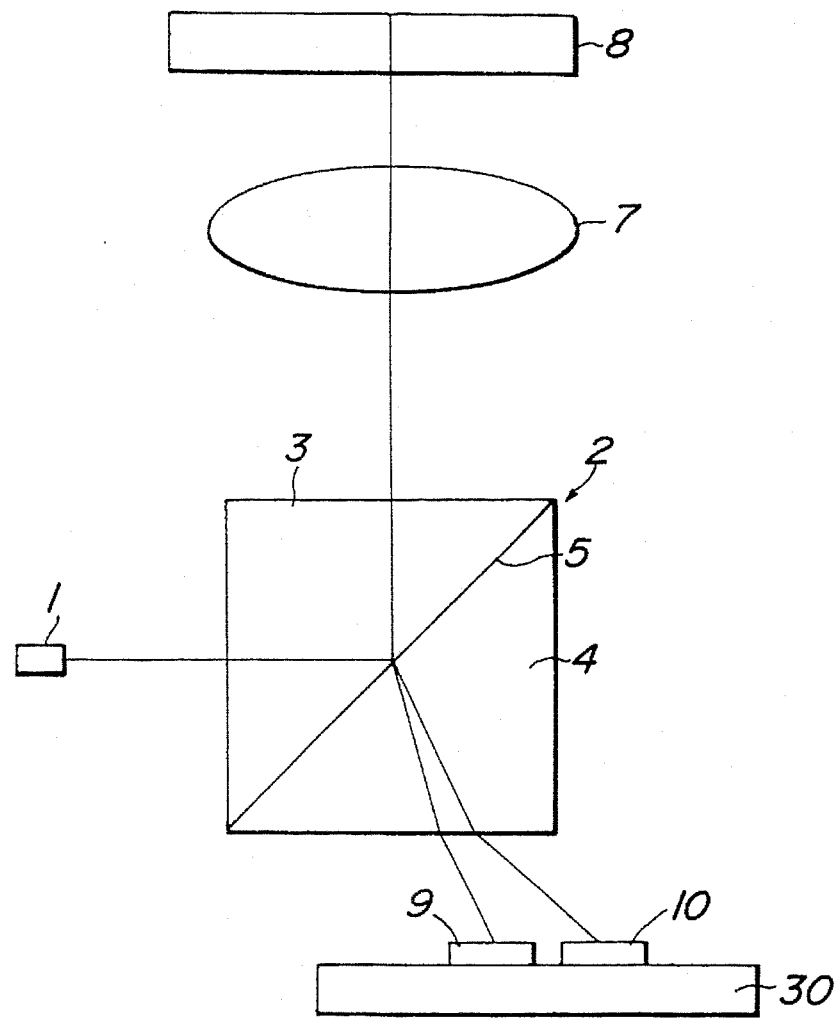
FIG. 5 is a schematic view showing a first embodiment of the optical head according to the invention.

FIG. 5 is a schematic view showing a first embodiment of the optical head according to the invention. The optical head comprises semiconductor laser 1, composite prism 2, objective lens 7 serving as a converging means, and first and second photodetectors 9 and 10 provided on a common semiconductor substrate 30. The composite prism 2 includes a glass prism 3 and a birefringent prism 4 which are cemented together by means of a dielectric multilayer film 5. For the sake of simplicity, the dielectric multilayer film 5 is also called a dielectric film.

According to the invention, the composite prism 2 is constructed such that a difference between a refractive index of the glass prism 3 and a refractive index of the birefringent prism 4 for at least one of ordinary light and extraordinary light is not less than 0.15 and a difference between a refractive index of the birefringent prism 4 for the ordinary light and that for the extraordinary light is not less than 0.03. For the sake of explanation, the refractive index of the birefringent prism 3 for the ordinary light is assumed to be 1.54 and that for the extraordinary light is assumed to be 1.57 which is larger than the index for the ordinary light by 0.03, and the refractive index of the glass prism 2 is assumed to be 1.42 which is smaller than the refractive index of the birefringent prism for the extraordinary light by 0.15. The dielectric film 5 is constructed such that substantially 100% of the P-polarized component and more than 70% of the S-polarized component are transmitted through the dielectric film and less than 30% of the S-polarized component is reflected by the dielectric film.

A linearly polarized laser beam emitted by the semiconductor laser 1 is made incident upon the dielectric film 5 through the glass prism 3 as the S-polarized beam. Therefore, more than 70% of the incident laser beam is reflected by the dielectric film 5 and emanates from the glass prism 3. Then, the laser beam is projected onto a magneto-optical record medium 8 by means of the objective lens 7 as a very fine spot. A return laser beam reflected by the magneto-optical record medium 8 is converged by the objective lens 7 and is made incident upon the glass prism 3 of the composite prism 2.

A polarizing plane of the return laser beam is rotated by ±θo due to the Kerr effect in accordance with information record on the record medium 8. Therefore, the return beam is not consisting of the S-polarized component, but contains the P-polarized component. Substantially 100% of the P-polarized component and less than 30% of the S-polarized component of the return beam are transmitted through the dielectric film 5 and are made incident upon the birefringent prism 4. Then, the return beam being made incident upon the birefringent prism 4 is separated into a first beam (ordinary light) and a second beam (extraordinary light). It should be noted that the first and second beams are polarized in orthogonal directions. The first and second beams emanating from the birefringent prism 2 are separately received by the first and second photodetectors 9 and 10, respectively. The first and second photodetectors 9 and 10 are provided on a surface of the semiconductor substrate 30 which is arranged in parallel with an exit surface of the birefringent prism 4.

Figure 6:
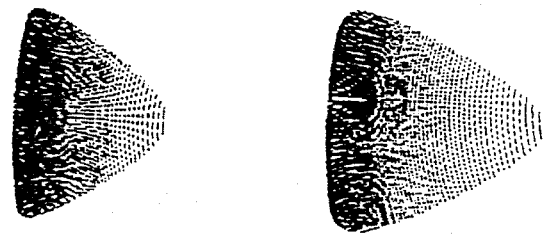
FIG. 6 is a schematic view illustrating spot patterns in the optical head of FIG. 5.

FIG. 6 is a schematic view showing spot diagrams of the first and second beams on the first and second photodetectors 9 and 10 for a case in which the composite prism 2 is formed as a cube having a side of 3 mm and the semiconductor substrate 30 is arranged such that a distance between the exit surface of the birefringent prism 4 and the first and second photodetectors 9 and 10 is about 1.8 mm and the first photodetector 9 receiving the first beam is positioned at a best focus point. As can be seen from FIG. 6, a size of the spots of the first and second beams on the first and second photodetectors 9 and 10 amounts to about 50 μm and further these spots are positively separated from each other.

According to the invention, the above feature can be attained by the special construction of the composite prism 2 that a difference between a refractive index of the birefringent prism 4 for the ordinary light and that for the extraordinary light is not less than 0.03 and a difference between the refractive index of the glass prism 3 and the refractive index of the birefringent prism 4 for at least one of ordinary light and extraordinary light is not less than 0.15. That is, in the embodiment illustrated in FIG. 5, by designing a difference between the refractive index of the glass prism 3 and the refractive index of the birefringent prism 4 for the extraordinary light to be 0.15, the second beam can have sufficient astigmatism and come, so that a size of the spot of the second beam on the second photodetector 10 can be increased. Further, by setting a difference between the refractive indices of the refringent prism 4 for the ordinary light and the extraordinary light to 0.03, it is possible to increase a separation angle between the ordinary light and the extraordinary light, so that they can be separated from each other positively.

If a difference between the refractive indices of the refringent prism 4 for the ordinary light and the extraordinary light is smaller than 0.03 and a difference between the refractive index of the glass prism 3 and the refractive index of the birefringent prism 4 for at least one of the ordinary light and extraordinary light is smaller than 0.15, the separation angle between the first and second beams becomes very small, so that they could not be separated positively. Moreover, a size of the spots of the first and second beams on the first and second photodetectors becomes too small. Therefore, it is necessary to provide an additional means for separating the first and second beams positively, and thus the optical head is liable to be large in size and expensive in cost.

In FIG. 5, due to the Kerr effect, the polarizing plane of the return beam reflected by the magneto-optical record medium 8 is rotated in accordance with the information recorded in the record medium and this rotation is converted into a variation in the intensity of the first and second beams separated by the birefringent prism 4. Therefore, an information signal can be reproduced from a difference between output signals from the first and second photodetectors 9 and 10 which receive the first and second beams, respectively. Focusing error signal and tracking error signal may be derived in accordance with the known astigmatism method and push-pull method, respectively by constructing one of or both of the first and second photodetectors to have four light receiving regions. As stated above, according to the invention, a size of the first and second beams impinging upon the first and second photodetectors 9 and 10, respectively is large, and therefore the four light receiving regions may be separated from each other by dividing area having a width of about 10 μm. Moreover, a sufficiently large astigmatism is introduced in these beams, it is possible to obtain the focusing error signal having a wide linear range near the zero cross point of the S-shaped characteristic curve.

In the present invention, it is no more necessary to set the apex angle γ of the birefringent prims smaller than 90° in order to increase the separation angle between the ordinary light α and the extraordinary light β as well as to introduce a large astigmatism like as the known optical head shown in FIG. 2. Moreover, in this known optical head illustrated in FIG. 2, in order to increase the Kerr rotation angle, the optic axis of the birefringent prism is inclined. However, in the present invention, the return beam impinging upon the birefringent prism 4 is separated into the ordinary light and extraordinary light, and therefore any rotation of the polarizing plane of the return beam does not occur.

Figure 7:
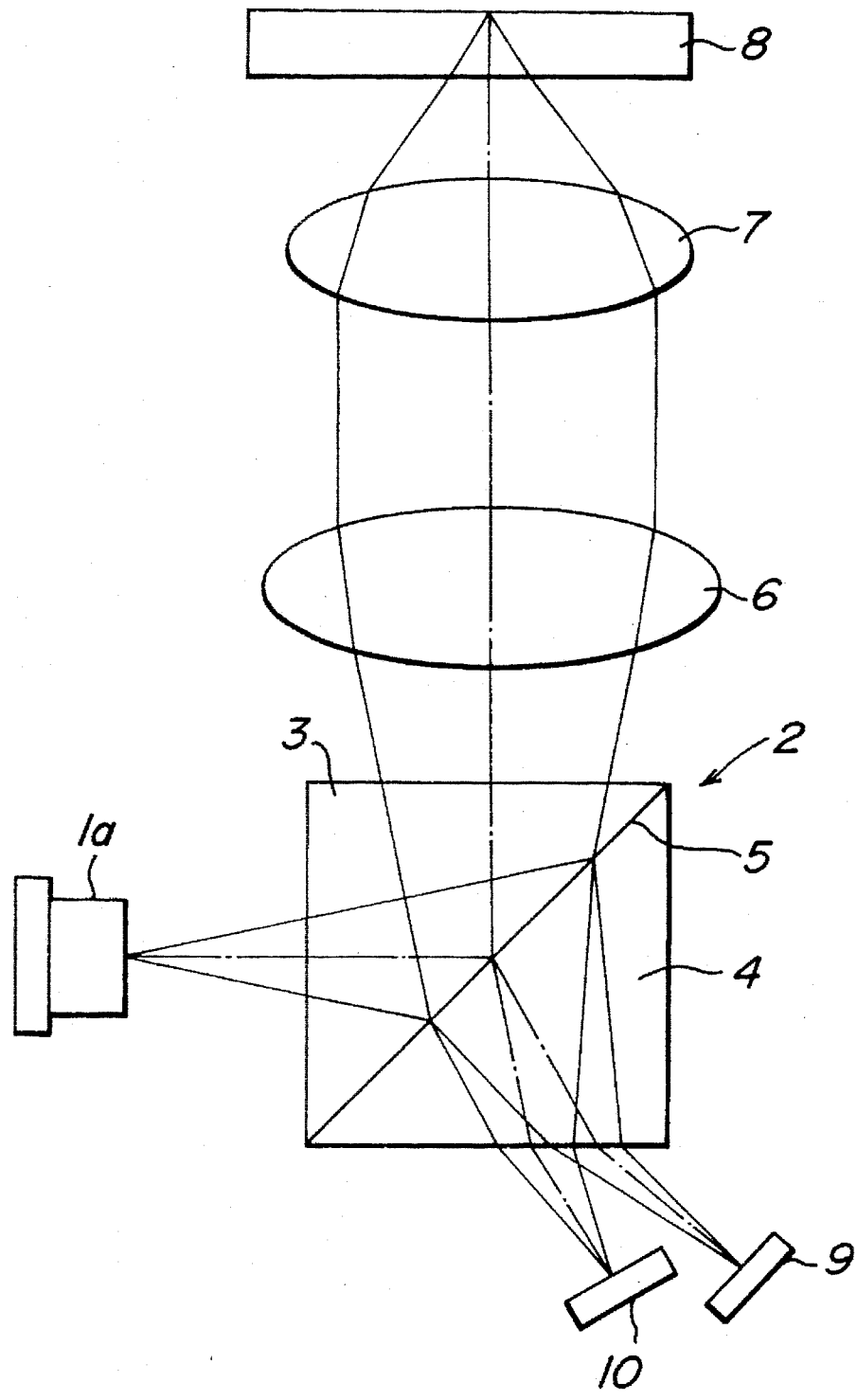
FIG. 7 is a schematic view depicting a second embodiment of the optical head according to the invention.

FIG. 7 is a schematic view showing a second embodiment of the optical head according to the invention. In the present embodiment, a laser beam emitted by a semiconductor laser provided in a package 1a is made incident, as a diverging S-polarized beam, upon a dielectric film 5 of a composite prism 2 from a side of a glass prism 3. The S-polarized beam reflected by the dielectric film 5 emanates from the glass prism 3 and is made incident upon a magneto-optical record medium 8 by means of a collimator lens 6 and an objective lens 7 as a fine spot. A return beam reflected by the magneto-optical record medium 8 is made incident, as a converging beam, upon the dielectric film 5 from the glass prism 3. A return beam transmitted through the dielectric film 5 is separated into first beam (ordinary light) and second beam (extraordinary light) whose polarizing planes are perpendicular to each other. These first and second beams are received by first and second photodetectors 9 and 10, respectively.

In the present embodiment, the glass prism 3 of the composite prism 2 is made of BK-7 glass having a refractive index of 1.5168 for a wavelength of 587.6 nm and the birefringent prism 4 is made of $LiNbO_2$ having refractive indices for the ordinary light and extraordinary light of 2.286 and 2.200, respectively for D-line of Na (589.3 nm). Since the refractive index for the ordinary light is larger than that for the extraordinary light, so that a positional relationship of the first and second photodetectors 9 and 10 becomes opposite to that of the first embodiment shown in FIG. 5. The dielectric film 5 reflects almost 100% of the S-polarized component and more than 70% of the P-polarized component, and reflects smaller than 30% of the P-polarized component.

The first and second photodetectors 9 and 10 are arranged separately from each other at best focus positions of the first and second beams, respectively. FIG. 8A is a plan view showing the second photodetector 10 having a single light receiving region 10a on which a spot 12 of the second beam (extraordinary light) is made incident. FIG. 8B is a plan view illustrating the first photodetector 9 having four light receiving regions 9a, 9b, 9c and 9d on which a spot 11 of the first beam (ordinary light) is formed. It should be noted that the first and second beams include the astigmatism and coma, so that their spots are not circle, but in FIGS. 8A and 8B, they are shown to be circular for the sake of simplicity. This may be applied to other embodiments to be explained later.

The information signal is derived by a difference between the output signals of the first and second photodetectors 9 and 10, and the focusing error signal and tracking error signal are derived by processing output signals from the four light receiving regions 9a to 9d of the first photodetector 9 in accordance with the astigmatism method and push-pull method, respectively.

In the present embodiment, the converging means is consisting of the collimator lens 6 and objective lens 7, so that a distance between the collimator lens and the objective lens can be changed at will. Therefore, this embodiment may be advantageously applied to a separation type optical head in which the objective lens 7 is provided in a movable unit and the remaining elements are arranged in a stationary unit. Furthermore, since the first and second photodetectors 9 and 10 are arranged separately from each other, they may be arranged at optimum positions.

Figure 9:
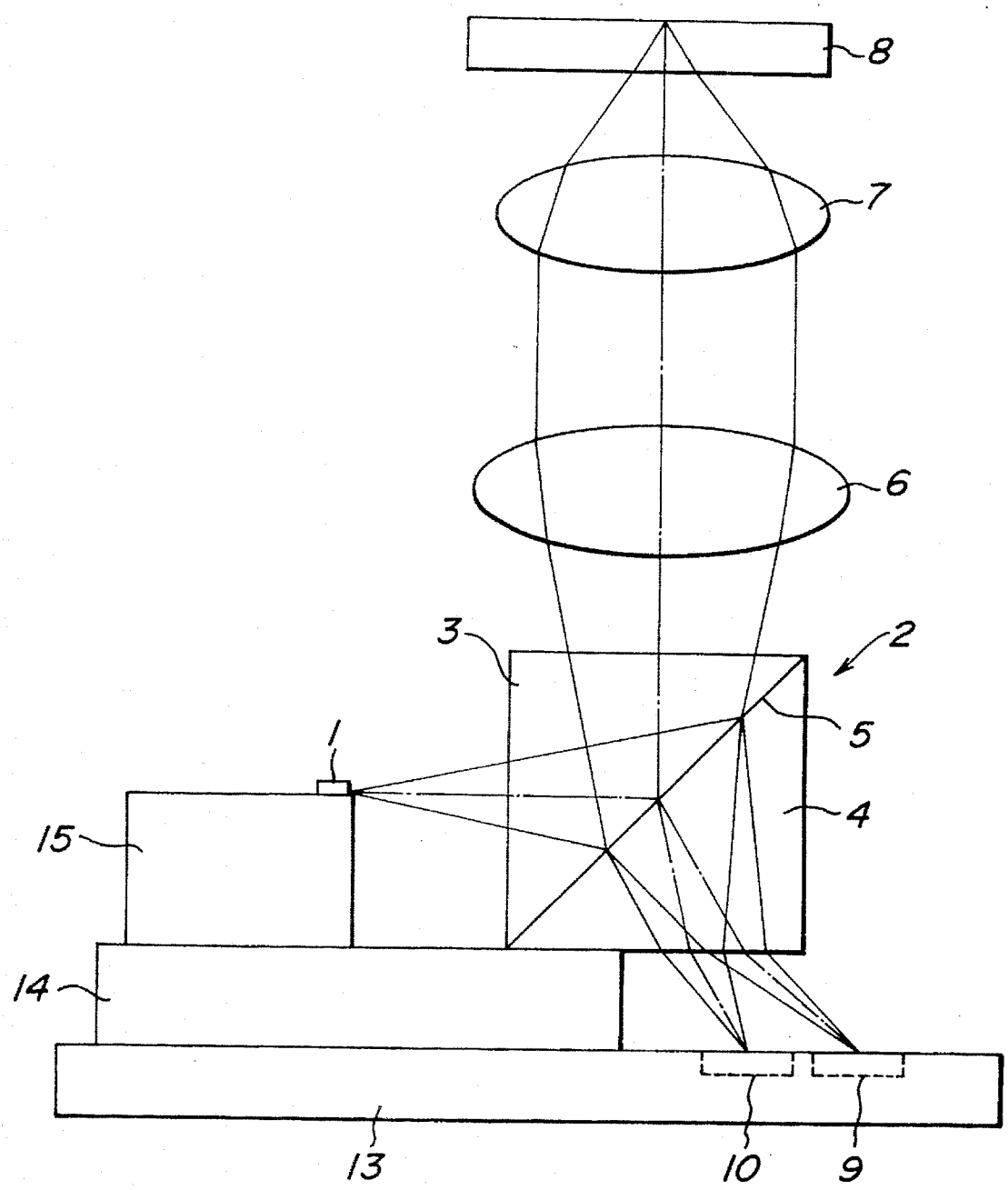
FIG. 9 is a schematic view illustrating a third embodiment of the optical head according to the invention.
Figure 10:
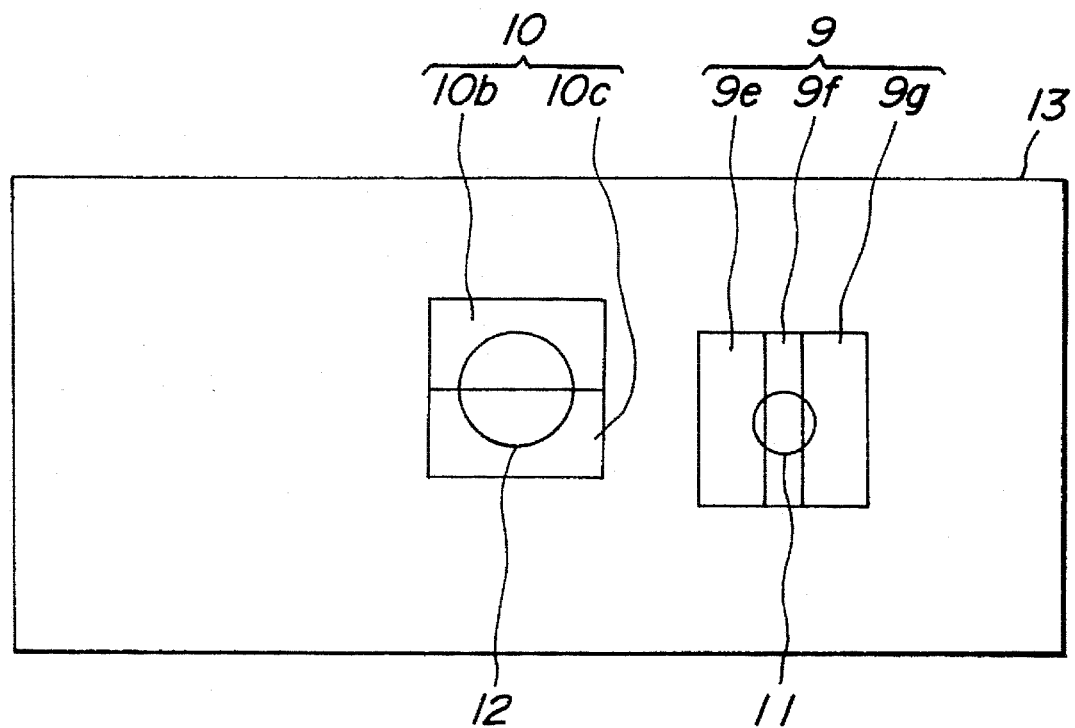
FIG. 10 is a plan view depicting photodetectors of the third embodiment.

FIG. 9 is a schematic view showing a third embodiment of the optical head according to the invention. In the present embodiment, there is provided a semiconductor substrate 13 on which a submount 15 is arranged via a spacer 14, and a semiconductor laser 1 is provided on the submount 15. A composite prism 2 having the same construction as that of the second embodiment is arranged on the spacer 14. First and second photodetectors 9 and 10 are provided on the semiconductor substrate 13. As illustrated in FIG. 10, the first photodetector 9 comprises three light receiving regions 9e, 9f and 9g, and the second photodetector 10 includes two light receiving regions 10b and 10c which are divided in a direction perpendicular to a dividing direction of the three light receiving regions of the first photodetector. The composite prism 2 and semiconductor substrate 13 are arranged such that the semiconductor substrate is parallel with an exit surface of the birefringent prism 4 of the composite prism 2 from which the first and second beams emanate, and the first beam is just forced on the first photodetector 9 when an objective lens 7 is in an in-focused position with respect to a magneto-optical record medium 8.

Since the birefringent prism 4 has different refractive indices for the ordinary light and extraordinary light, the first and second beams emanating from the birefringent prism are focused at different points from each other. Therefore, the second beam is not focused on the second photodetector 10 and a spot 12 of the second beam formed on the second photodetector 10 becomes smaller than a spot 11 of the first beam formed on the first photodetector 9. Further, when the objective lens 7 is deviated from the in-focused point with respect to the magneto-optical record medium 8, a shape of the spot 11 of the first beam formed on the first photodetector 9 is changed due to the astigmatism.

In the present embodiment, the focusing error and tracking error signals are derived in the following manner. It is now assumed that output signals from the three light receiving regions 9e, 9f and 9g of the first photodetector 9 are Ie, If and Ig, respectively. Then, the focusing error signal FES is derived from FES=Ie−If+Ig. It is further assumed that output signals from the first and second light receiving regions 10b and 10c are Jb and Jc, respectively. Then, the tracking error signal TES is derived from TES=Jb−Jc. Further, the information signal S may be obtained by S=(Ie+If+Ig)−(Jb+Jc). The remaining structure and operation are the same as those of the second embodiment.

In the present embodiment, the focusing error signal is derived from the output signals produced by the first photodetector 9 receiving the first beam having a small cross section in the in-focused condition, and the tracking error signal is derived from the output signals generated by the second photodetector 10 which receives the second beam having a large cross section.

Since a size of the spot 12 of the second beam impinging upon the second photodetector 10 is large, a positioning of the second photodetector with respect to the second beam can be performed easily and precisely. Further, the first and second photodetectors 9 and 10 are provided on the same semiconductor substrate 13, the number of parts can be reduced and a cost of the optical head can be decreased. Moreover, the semiconductor laser 1, composite prism 2 and first and second photodetectors 9 and 10 are arranged as single integral unit, and thus these elements can be mutually arranged in an easy and precise manner. In this manner, it is possible to attain the stable optical head.

Figure 11:
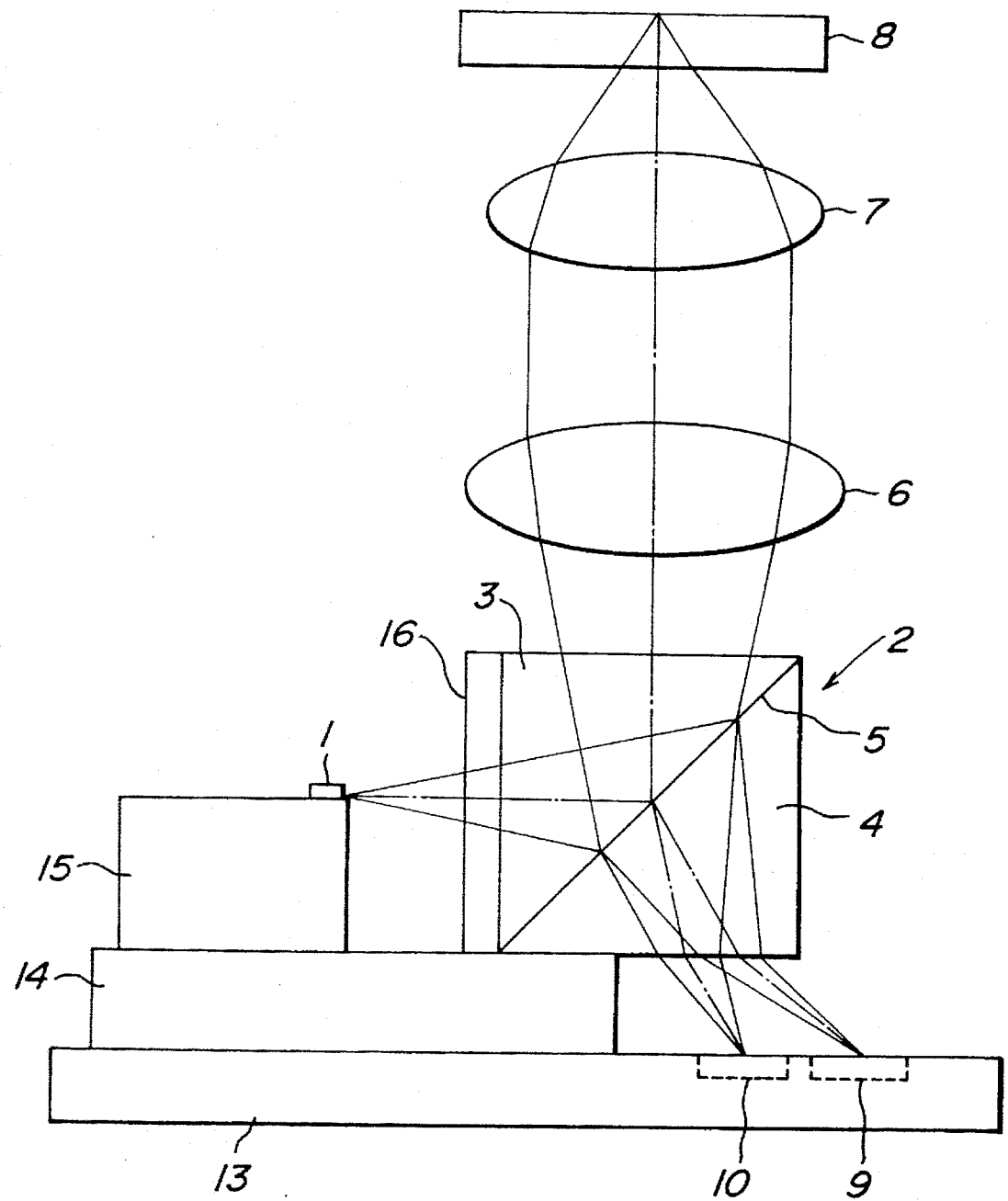
FIG. 11 is a schematic view representing a fourth embodiment of the optical head according to the invention.
Figure 12:
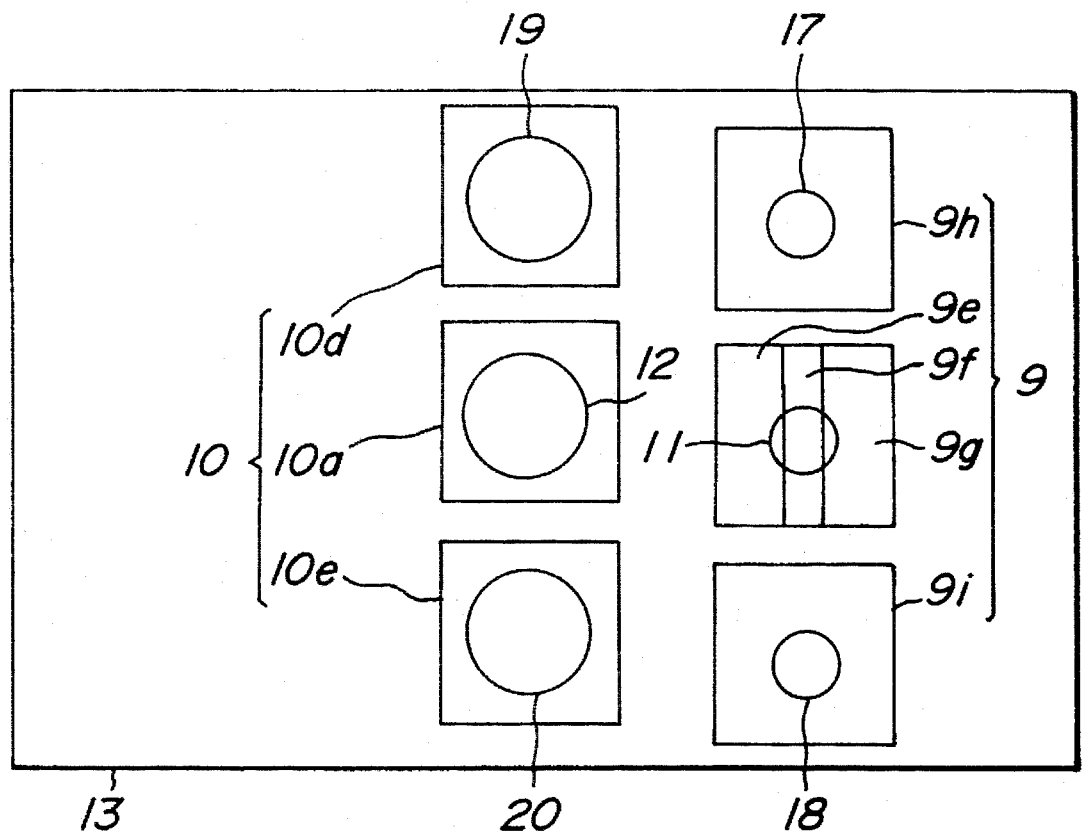
FIG. 12 is a plan view illustrating photodetectors of the fourth embodiment.

FIG. 11 is a schematic view showing a fourth embodiment of the optical head according to the invention. The present embodiment differs from the third embodiment illustrated in FIG. 9 only in a point that a diffraction grating 16 is arranged between the semiconductor laser 1 and the composite prism 2 and the first and second photodetectors 9 and 10 include three discrete light receiving elements as depicted in FIG. 12. The diffraction grating 16 serves to divide the laser beam emitted by the semiconductor laser 1 into a single main beam and first and second sub-beams. As shown in FIG. 12, the first photodetector 9 includes three discrete light receiving elements 17; 9e, 9f, 9g; 18. The middle light receiving element is divided into three light receiving regions 9e, 9f and 9g and receives the spot 11 of the first main beam. The light receiving elements 9h and 9i receive spots 17 and 18 of first beams of first and second sub-beams. The second photodetector 10 includes three discrete light receiving elements 10d, 10a and 10e. The middle light receiving element 10a receives a spot 12 of the second beam of the main beam, the light receiving element 10d receives a spot 19 the second beams of the first sub-beams, and the light receiving element 10e receives a spot 20 of the second beam of the second sub-beam.

The single main beam and two sub-beams divided by the diffraction grating 16 are made incident upon the magneto-optical record medium 8 by means of the composite prism 2, collimator lens 6 and objective lens 7 as fine spots which are aligned in a direction inclined by a given angle with respect to a direction of information tracks on the record medium. These three beams are reflected by the magneto-optical record medium 8, and then each of three return beams is made incident upon the birefringent prism 4 and is separated into first and second beams. The first and second beams of the main beam as well as the first and second beams of the two sub-beams are received by the first and second photodetectors 9 and 10 as explained above with reference to FIG. 13.

In the present embodiment, optical axes of the first and second sub-beams are set on a plane which can be obtained by rotating, by 90° about an optical axis of the main beam, a plane including a normal line to a boundary surface between the glass prism 3 and the birefringent prism 4 via the dielectric film 5 and the optical axis of the main beam. Then it is possible to prevent undesired interference between the first and second beams of the main beam and the sub-beams, because the return beam of the main beam is separated into the first and second beams on the plane substantially including the optical axis of the main beam and the normal line to the boundary surface between the glass prism 2 and the birefringent prism 4.

In order to avoid the above mentioned interference, the optical axes of the first and second sub-beams may be set on a plane which is obtained by rotating said plane including the optical axis of the main beam and normal line to the dielectric film 5 by 30°–90°.

The output signals from the light receiving elements 9e–9h of the first photodetector 9 are denoted as Ie–Ii, respectively. Then, the focusing error signal FES may be derived from FES=Ie−If+Ig. Further, the output signals from the light receiving elements 10a, 10d and 10e are represented by Ja, Jd and Je, respectively. Then, the tracking error signal TES may be derived by the three beam method as follows:

$$TES=(Ih+Jd)-(Ii+Je)$$

Furthermore, the information signal S may be obtained in the following manner:

$$S=(Ie+If+Ig)-Ja$$

The remaining construction and operation of the present embodiment are identical with those of the third embodiment.

In the present embodiment, the tracking error signal TES is derived by the three beam method, and thus it is possible to obtain the tracking error signal much more stably than the push-pull method.

In the fourth embodiment, the diffraction grating 16 is formed as a single independent element, but it may be formed in the incident surface of the glass prism 3 of the composite prism 2 facing the semiconductor laser 1. Further, the tracking error signal may be derived from the output signals produced from one of the first and second photodetectors 9 and 10.

Figure 13:
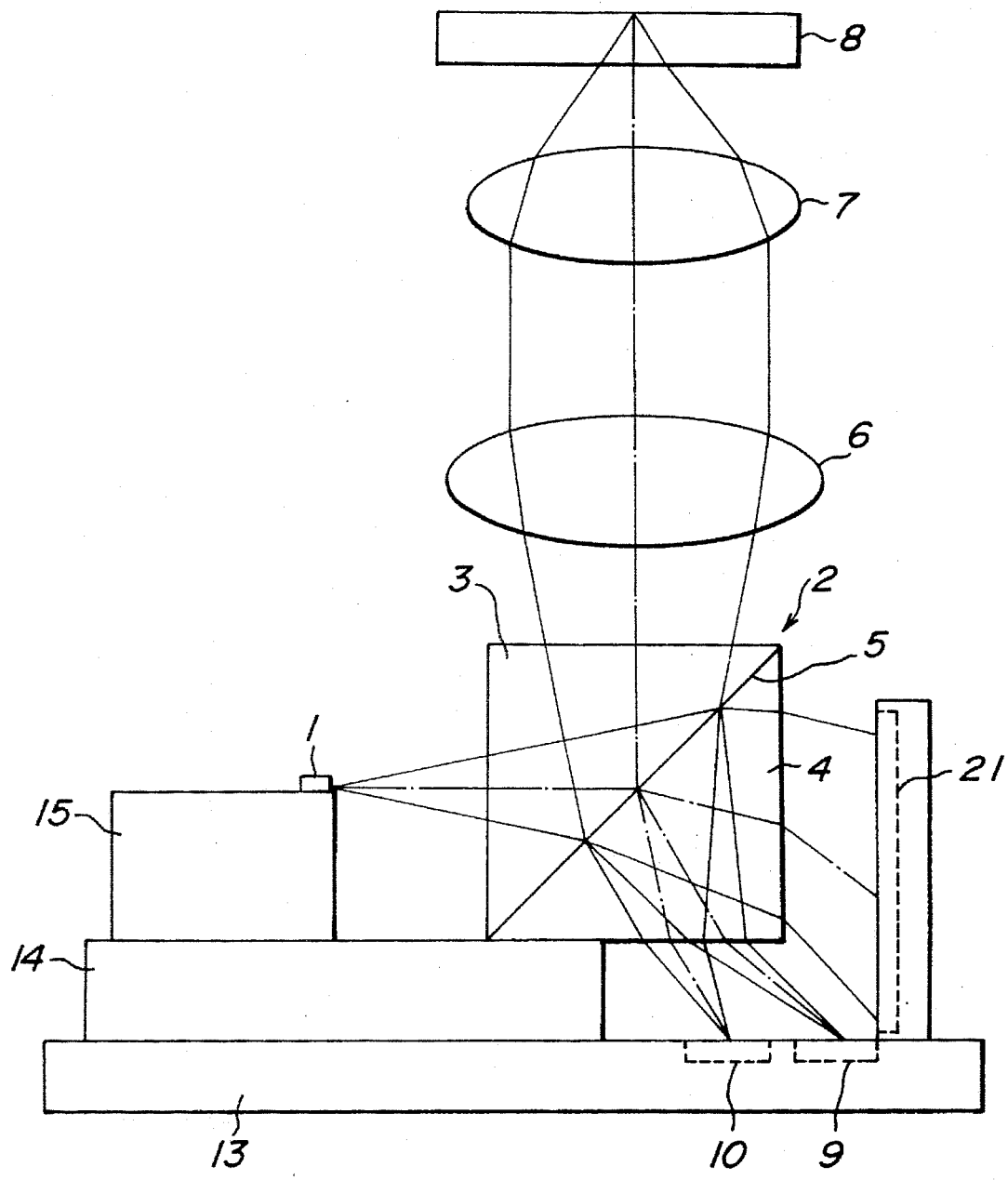
FIG. 13 is a schematic view depicting a fifth embodiment of the optical head according to the invention.

FIG. 13 is a schematic view depicting a fifth embodiment of the optical head according to the invention. The present embodiment differs from the third embodiment illustrated in FIG. 9 in a point that a laser beam emitted by the semiconductor laser 1, transmitted through the dielectric film 5 of the composite prism 2 and emanating from a side surface of the birefringent prism 4 is received by a third photodetector 21.

Less than 30% of the S-polarized beam incident upon the dielectric film 5 of the composite prism 2 from the side of the glass prism 3 is transmitted through the dielectric film and emanates from the side surface of the birefringent prism 4. In practice, the S-polarized bean is separated into ordinary component and extraordinary component, but in FIG. 13 they are represented as a single beam for the sake of simplicity. In the present embodiment, an output signal from the third photodetector 21 represents an intensity of the laser beam emitted by the semiconductor laser 1 and thus may be used to control an output power of the semiconductor laser in a usual manner. The remaining construction and operation of the present embodiment are identical with those of the third embodiment.

FIG. 14 is a schematic view showing a sixth embodiment of the optical head according to the invention. In the present embodiment, the third photodetector 21 is formed in the same semiconductor substrate 13 in which the first and second photodetectors 9 and 10 are formed. FIG. 15 is a plan view illustrating the first, second and third photodetectors 9, 10 and 21 of the present embodiment. The remaining construction and operation are the same as those of the fifth embodiment.

In the present embodiment all the photodetectors 9, 10 and 21 are formed in the same semiconductor substrate 13, so that the number of parts can be further reduced and a cost of the optical head becomes be decreased.

FIG. 16 is a plan view showing a modification of the first and second photodetectors 9 and 10 formed in the semiconductor substrate 13 in the first to fifth embodiments. In this modification, each of the first and second photodetectors 9 and 10 is formed by a plurality of thin light receiving regions. Then, a positional adjustment of the photodetectors 9 and 10 with respect to the beam spots 11 and 12 can be carried out easily by suitably selecting desired light receiving regions.

FIG. 7 is a schematic view showing a seventh embodiment of the optical head according to the invention. The present embodiment differs from the third embodiment shown in FIG. 9 in a point that the submount 15 is placed on the semiconductor substrate 13 without interposing the spacer therebetween and an aberration controlling means formed by a glass block 31 is provided between the semiconductor substrate 13 and the composite prism 2. Also in the present embodiment, the glass prism 3 of the composite prism 2 is made of BK-7 glass and the birefringent prism 4 is made of $LiNbO_3$. Further, the dielectric film 5 reflects almost 100% of the S-polarized component and more than 70% of the P-polarized component, and reflects smaller than 30% of the P-polarized component. Strictly speaking, the polarized condition of the S-polarized beam reflected by the dielectric prism 5 is changed due to the birefringent prism 4 and dielectric film 5. However, this change is very small and the principal function of the present invention is not affected by this, and therefore the above influence may be ignored.

In the present embodiment, the return beam reflected by the magneto-optical record medium 8, being made incident upon the birefringent prism 4 and separated into the first and second beams are received by the first and second photodetectors 9 and 10 via the astigmatism controlling means 31 having an exit surface 31a which is inclined with respect to a surface 3a of the glass prism upon which the return beam is made incident.

Now the operation of the birefringent prism 4 and astigmatism controlling means 31 will be explained in detail. At first, it is assumed that the optical axis of the incident beam emitted by the semiconductor laser 1 and being made incident upon the dielectric film 5 is x axis, an optical axis of the incident beam reflected by the dielectric film 5 is z axis and an axis perpendicular to both of these x and z axes is y axis. Further, coordinate system is defined such that its origin is at a cross point between the optical axis and the dielectric film 5.

The birefringent prism 4 is arranged such that its optic axis is parallel with the plane x-y and is inclined by 45° with respect to the x axis. It should be noted that the above mentioned direction of the optic axis of the birefringent prism 4 is determined only for the sake of explanation, and an actual direction of the optic axis has to be determined such that time averages of intensity of the first ordinary beam and second extraordinary beam become substantially identical with each other and the first and second beams can be separated from each other at a large separation angle. Moreover, the direction of the optic axis of the birefringent prism 4 is changed in accordance with the dielectric film 5. Therefore, a precise direction of the optic axis has to be determined by performing complicated calculations. However, it has been found that the above mentioned direction of the optic axis is not deviated from the precisely calculated direction. Moreover, the optical axis of the extraordinary light does not situate on the z-x plane, but its deviation is so small that it may be ignored.

The refringent prism 4 serves like as a usual glass prism for the ordinary light, so that the astigmatism and coma are introduced in the ordinary light, i.e. the first beam by the composite prism 2. A focal line of this astigmatism extends in the x axis or y axis, and a tail of the coma extends in the x axis. For the extraordinary light, the birefringent prism 4 shows different refractive indices in accordance with a propagating direction of the light. Therefore, the extraordinary light is subjected to an aberration, particularly astigmatism which is different from that for the ordinary light. In this case, the optic axis of the birefringent prism 4 is inclined by 45° with respect to the x axis, and thus the astigmatism having directions inclined by ±45° with respect to the x axis is introduced in the extraordinary light.

Then, the ordinary light and extraordinary light having different aberrations introduced therein are made incident upon the aberration controlling means 31 and are refracted by its exit surface 31a. Then, the coma in the ordinary light is suppressed and the astigmatism in the ordinary light is enhanced, and both the coma and astigmatism in the extraordinary light are suppressed. These ordinary light and extraordinary light are made incident upon the first and second photodetectors 9 and 10, respectively.

Why the astigmatism of the extraordinary light is suppressed can be explained qualitatively in that the astigmatisms in the x and y axes and the astigmatisms in ±45° directions with respect to the x axis are superimposed one another. However, in order to explain this quantitatively, very complicated calculations are required. In fact, the manner of controlling the aberrations may be confirmed by a light ray trace by using an electronic computer.

FIGS. 19A, 19B and 19C are schematic views showing spot diagrams of the ordinary light and extraordinary light on the first and second photodetectors 9 and 10. FIG. 19B is in an in-focused condition, and FIGS. 19A and 19C are in de-focused conditions in opposite directions. As can be seen from the spot diagrams, according to the invention, in the ordinary light the coma is suppressed and in the extraordinary light, both the coma and astigmatism are suppressed.

Figure 18:
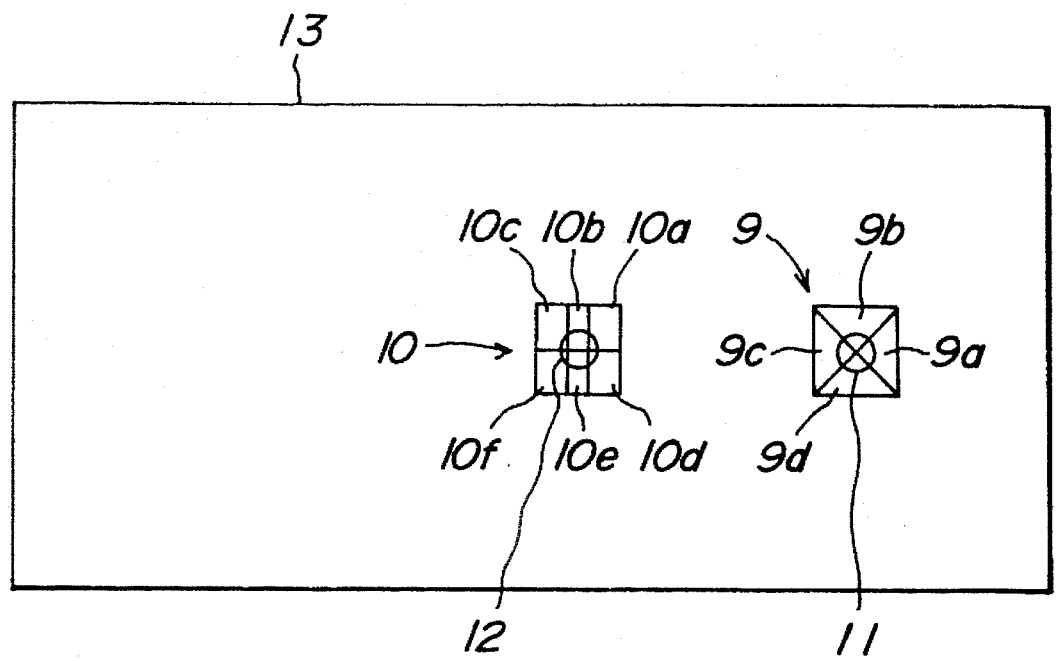
FIG. 18 is a plan view showing photodetectors of the optical head shown in FIG. 17.

FIG. 18 is a plan view illustrating the construction of the first and second photodetectors 9 and 10. As explained above, in the ordinary light being made incident upon the first photodetector 9 the coma has been suppressed by the aberration controlling means 31, and when the focusing error signal and tracking error signal are to be derived from output signals produced by the first photodetector 9, the first photodetector 9 includes four light receiving regions 9a, 9b, 9c and 9d. Now the output signals from these light receiving regions 9a to 9d are denoted as Ia to Id, respectively. Then, the focusing error signal FES1 may be obtained in the following manner by the astigmatism method:

$$FES1 = Ia - Ib + Ic - Id$$

Further the tracking error signal TES1 may be obtained by the push-pull method by the following equation:

$$TES1 = Ia + Ib - Ic - Id$$

The coma and astigmatism of the extraordinary light received by the second photodetector 10 have been suppressed, and therefore when the focusing error signal and tracking error signal are derived from the output signals of the second photodetector, the second photodetector includes six light receiving regions 10a to 10f. Now it is assumed that these light receiving regions 10a to 10f produce output signals Ja to Jf, respectively, the focusing error signal FES2 may be derived by the beam size method in the following manner:

$$FES2 = Ja - Jb + Jc + Jd - Je + Jf$$

Further, the tracking error signal TES2 may be obtained by the push-pull method as follows:

$$TES2 = Ja + Jb + Jc - Jd - Je - Jf$$

An information signal S may be derived as a difference between the output signals from the first and second photodetectors 9 and 10. That is, the information signal S may be derived in the following manner:

$$S = Ia + Ib + Ic + Id - Ja - Jb - Jc - Jd - Je - Jf$$

It should be noted that the focusing error signal and tracking error signal may be derived from only the ordinary light or extraordinary light or both the ordinary light and extraordinary light as explained above. In the latter case, the obtained two focusing error signals may be added to each other or may be subtracted from each other. Alternatively, the focusing error signal or tracking error signal may be derived from the ordinary light and the tracking error signal or focusing error signal may be derived from the extraordinary light. If the tracking error signal is derived only from the ordinary light or extraordinary light, the first photodetector 9 or second photodetector 10 may be divided into two light receiving regions. In this manner, the first and second photodetectors 9 and 10 may be divided into any desired configuration.

As explained above, in the present embodiment, the aberrations introduced in the ordinary light and extraordinary light can be controlled independently from each other by means of the aberration controlling means 31, and thus the focusing error signal can be derived by any desired method which is suitable for the ordinary light or extraordinary light. That is, when the ordinary light is used to derive the focusing error signal, the astigmatism method can be applied, and when the focusing error signal is derived from the extraordinary light, the beam size method can be advantageously used. In this manner, it is possible to derive the focusing error signal having good characteristics. Moreover, since the ordinary light and extraordinary light are refracted by the aberration controlling means 31, the first and second photodetectors 9 and 10 may be arranged closer to each other, so that a size of the optical head can be further reduced. The remaining operation of the present embodiment is identical with that of the third embodiment shown in FIG. 9.

Figure 20:
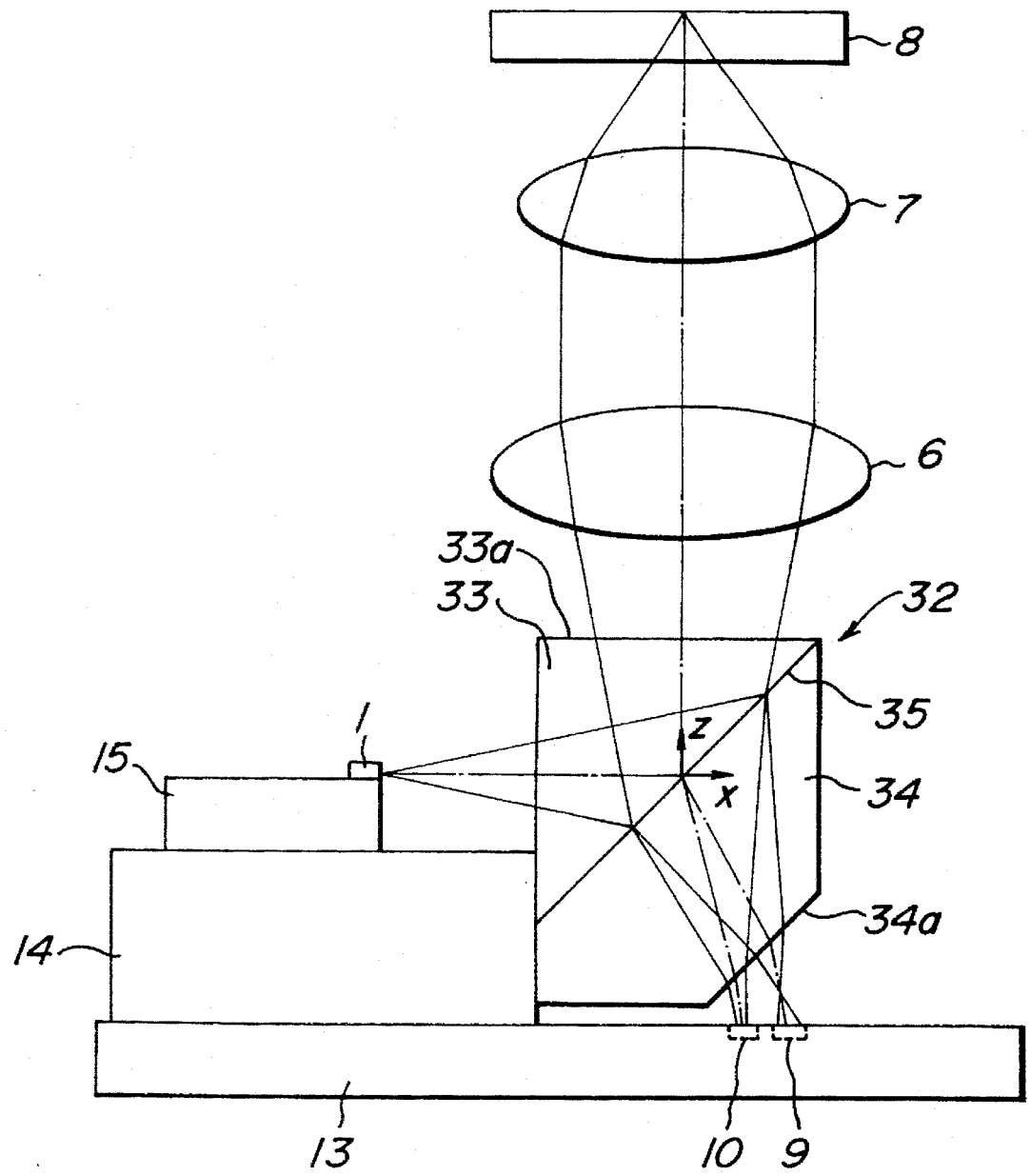
FIG. 20 is a schematic view illustrating an eighth embodiment of the optical head according to the invention.

FIG. 20 is a schematic view illustrating an eighth embodiment of the optical head according to the invention. In the present embodiment, the aberration controlling means is formed by an exit surface 34a of the birefringent prism 34 of a composite prism 32. The composite prism 32 includes a glass prism 33 and birefringent prism 34 cemented to each other by means of a dielectric film 35. Also in the present embodiment, the glass prism 33 is made of BK-7 glass and the birefringent prism 34 is made of LN crystal. The exit surface 34a constituting the aberration controlling means is inclined with respect to the surface 33a of the glass prism 33 upon which the return beam from a magneto-optical record medium 8 is made incident by means of collimator lens 6 and objective lens 7.

Figure 21:
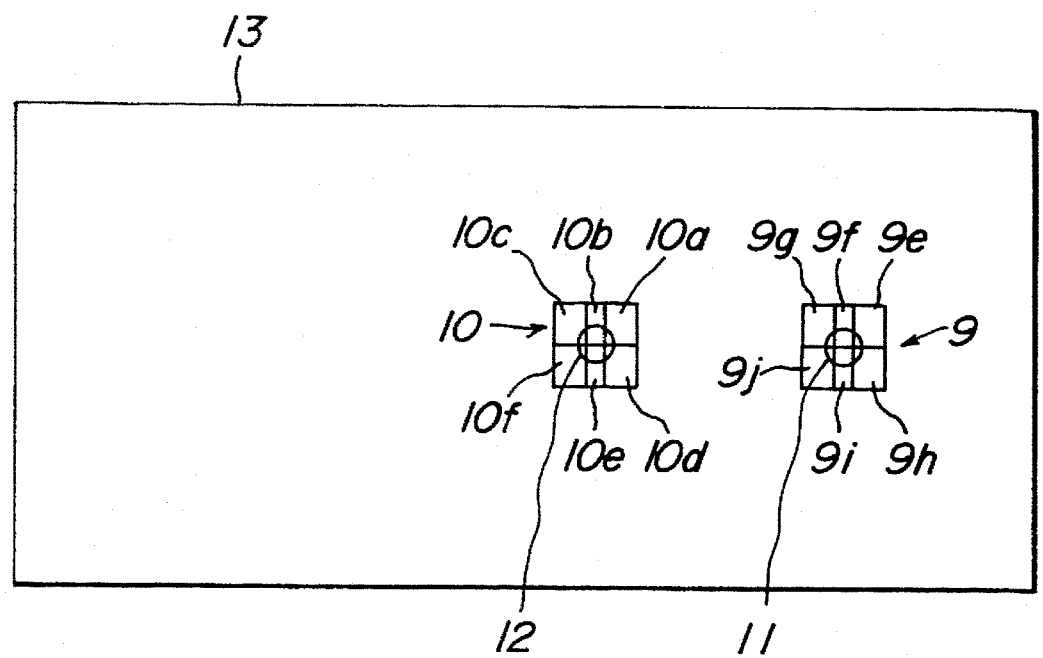
FIG. 21 is a plan view depicting photodetectors of the eighth embodiment.

FIG. 21 is a plan view showing first and second photodetectors 9 and 10 provided in a semiconductor substrate 13. The first photodetector 9 includes six light receiving regions 9e–9j and the second photodetector 10 comprises also six light receiving regions 10a–10f. The first and second photodetectors 9 and 10 are arranged such that when the objective lens 7 is in the in-focused position, sizes of spots 11 and 12 of the first and second beams on the first and second photodetectors 9 and 10, respectively are identical with each other. The composite prism 32 is secured to a spacer 14 which is placed on the semiconductor substrate 13, and the submount 15 for the semiconductor laser 1 is provided on the spacer 14. The remaining construction and operation of the present embodiment are substantially identical with those of the seventh embodiment shown in FIG. 18.

Figure 17:
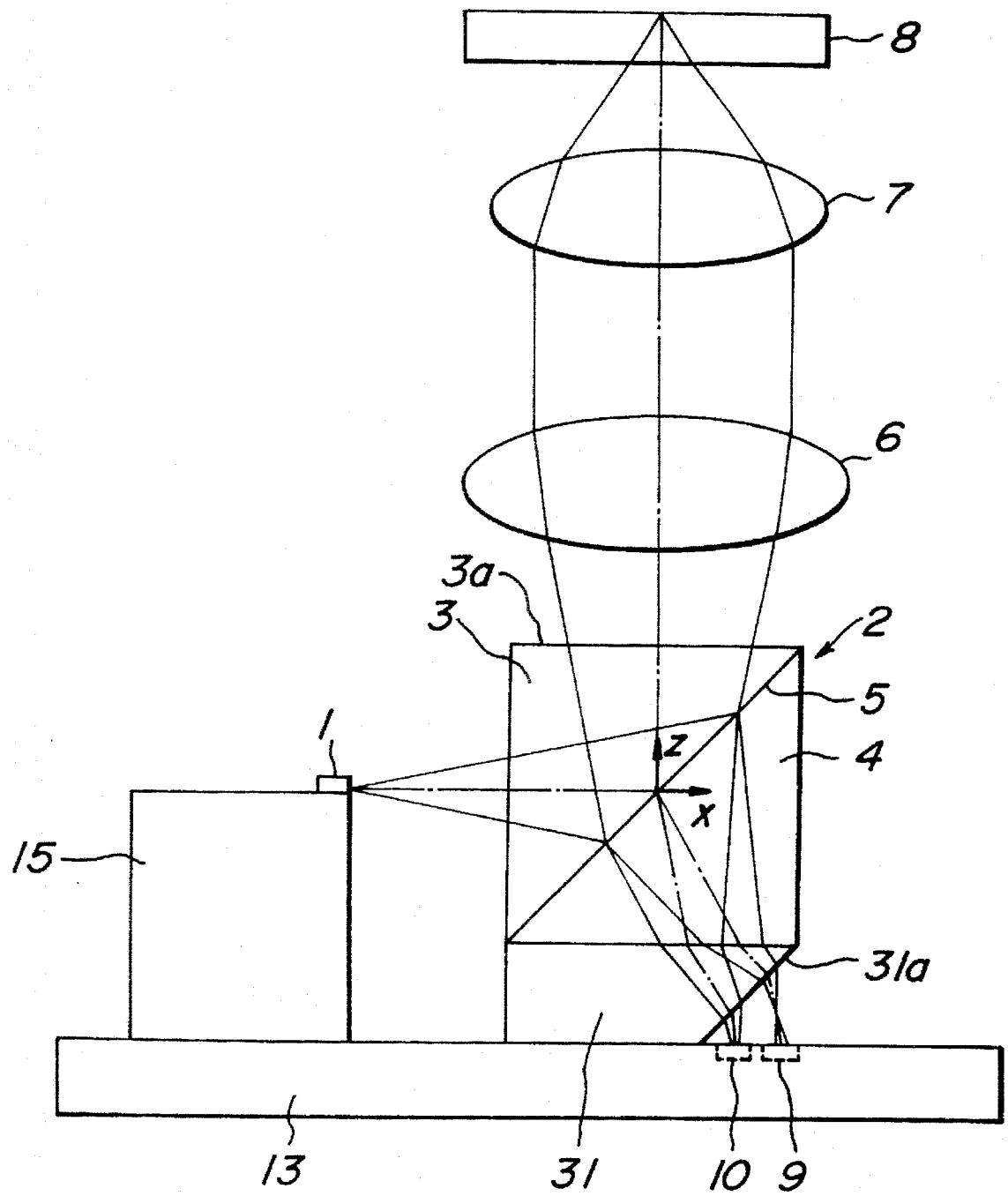
FIG. 17 is a schematic view depicting a seventh embodiment of the optical head according to the invention.

In the present embodiment, the exit surface 34a of the birefringent prism 34 of the composite prism 32 is inclined with respect to the return beam impinging surface 33a of the glass prism 33 to construct the aberration controlling means, so that it is possible to attain the spot diagram substantially identical with those illustrated in FIGS. 19A–19C. As compared with the seventh embodiment shown in FIG. 17, in the present embodiment the glass prism 31 constituting the aberration controlling means may be dispensed with.

It is now assumed that output signals from the six light receiving regions 9e–9j are denoted by Ie–Ij, respectively. Then, the focusing error signal FES1 may be derived by the beam size method detecting a size of the beam spot 11 in the x axis direction in the following manner:

$$FES1=Ie-If+Ig+Ih-Ii+Ij$$

Further the focusing error signal FES2 may be obtained from output signals Ja–Jf of the six light receiving regions 10a–10f of the second photodetector 10 also by the beam size method in the following manner:

$$FES2=Ja-Jb+Jc+Jd-Je+Jf$$

It is apparent from FIGS. 19A–19C that when the objective lens 7 and magneto-optical record medium 8 are moved out of the in-focused position, sizes of the first and second beam spots 11 and 12 change in opposite directions, and thus the focusing error signals FES1 and FES2 change in opposite polarities. Therefore, when a focus error signal FES is obtained from a difference between the focusing error signals FES1 and FES2 (FES=FES1–FES2), it is possible to increase a gain of the focusing error signal FES and to remove a focus offset component due to noise and assembling error.

The tracking error signal may be derived by the push-pull method from the output signals of one or both of the first and second photodetectors 9 and 10 like as the seventh embodiment. The information signal may be derived from a difference between the output signals of the first and second photodetectors 9 and 10.

It should be noted that in the present embodiment the submount 15 and composite prism 32 are mounted on the spacer 14, but it is also possible to delete the spacer. In this case, the submount 15 and composite prism 32 may be mounted directly on the semiconductor substrate 13.

Figure 22:
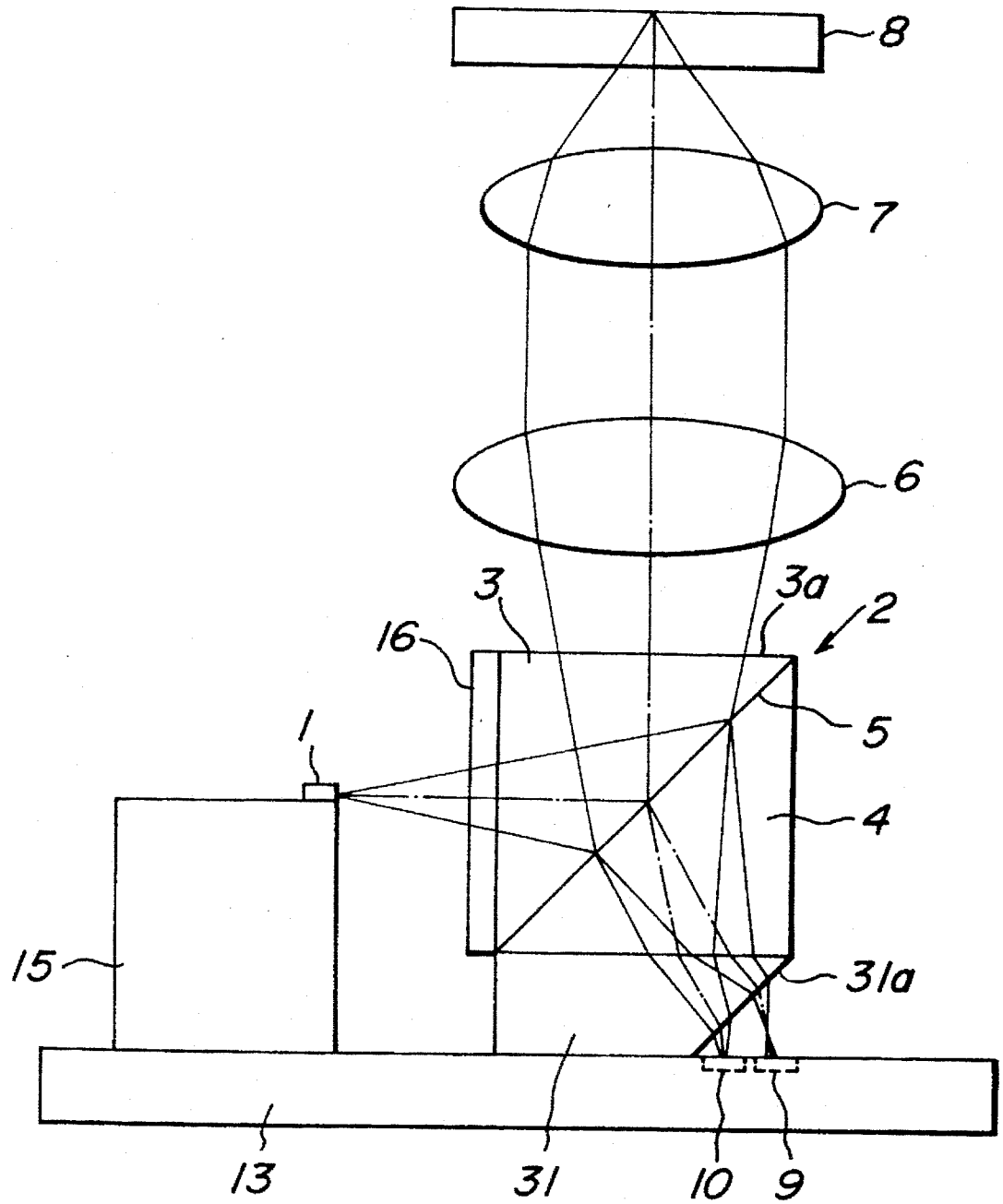
FIG. 22 is a schematic view representing a ninth embodiment of the optical head according to the invention.
Figure 23:
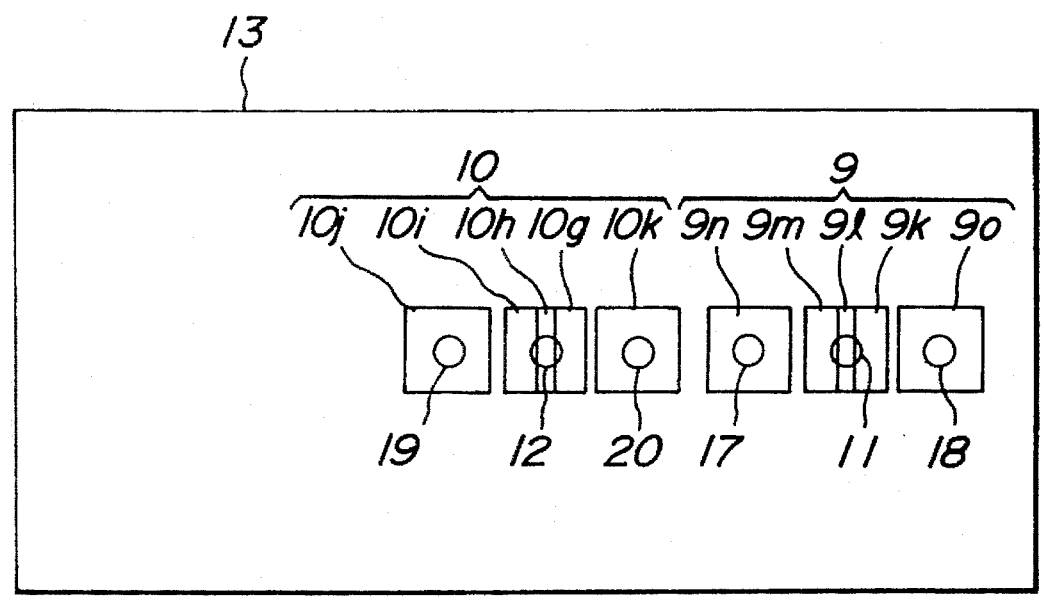
FIG. 23 is a plan view illustrating photodetectors of the ninth embodiment.

FIG. 22 is a schematic view showing a ninth embodiment of the optical head according to the invention. The present embodiment differs from the seventh embodiment illustrated in FIG. 17 only in a point that a diffraction grating 16 is arranged between the semiconductor laser 1 and the composite prism 2 and the first and second photodetectors 9 and 10 include three discrete light receiving elements as depicted in FIG. 23. The diffraction grating 16 serves to divide the laser beam emitted by the semiconductor laser 1 into a single main beam and first and second sub-beams. As shown in FIG. 23, the first photodetector 9 includes three discrete light receiving elements 9n; 9k, 9l, 9m; 9o. The middle light receiving element is divided into three light receiving regions 9k, 9l and 9m and receives the spot 11 of the first main beam. The light receiving elements 9n and 9o receive spots 17 and 18 of first beams of first and second sub-beams. The second photodetector 10 includes three discrete light receiving elements 10j; 10g, 10h, 10i; and 10k. The middle light receiving element includes three light receiving regions 10g, 10h and 10i, and receives a spot 12 of the second beam of the main beam, the light receiving element 10j receives a spot 19 the second beam of the first sub-beams, and the light receiving element 10k receives a spot 20 of the second beam of the second sub-beam.

The single main beam and two sub-beams divided by the diffraction grating 16 are made incident upon the magneto-optical record medium 8 by means of the composite prism 2, collimator lens 6 and objective lens as fine spots which are aligned in a direction inclined by a given angle with respect to a direction of information tracks on the record medium. These three beams are reflected by the magneto-optical record medium 8, and then each of three return beams is made incident upon the birefringent prism 4 and is separated into first and second beams. The first and second beams of the main beam as well as the first and second beams of the two sub-beams are received by the first and second photodetectors 9 and 10 as explained above with reference to FIG. 23.

The output signals from the light receiving elements 9k–9o of the first photodetector 9 are denoted as Ik–Io, respectively and the output signals from the light receiving elements 10g–10k of the second photodetector 10 are represented by Jg–Jk, respectively. Then, the focusing error signal FES may be derived in the following manner like as the eighth embodiment:

$$FES=(Ik-Il+Im)-(Jg-Jh+Ji)$$

Further, the tracking error signal TES may be derived by the three beam method as follows:

$$TES=(In+Jj)-(Io+Jk)$$

Moreover, the information signal S may be obtained in the following manner:

$$S=(Ik+Ii+Im)-(Jg+Jh+Ji)$$

In the present embodiment, the tracking error signal TES is derived by the three beam method, so that the tracking error signal can be obtained much more stably than the push-pull method.

In the fourth embodiment, the diffraction grating 16 is formed as a single independent element, but it may be formed in the incident surface of the glass prism 3 of the composite prism 2 facing the semiconductor laser 1. Further, the tracking error signal may be derived from the output signals produced from one of the first and second photodetectors 9 and 10.

Figure 24:
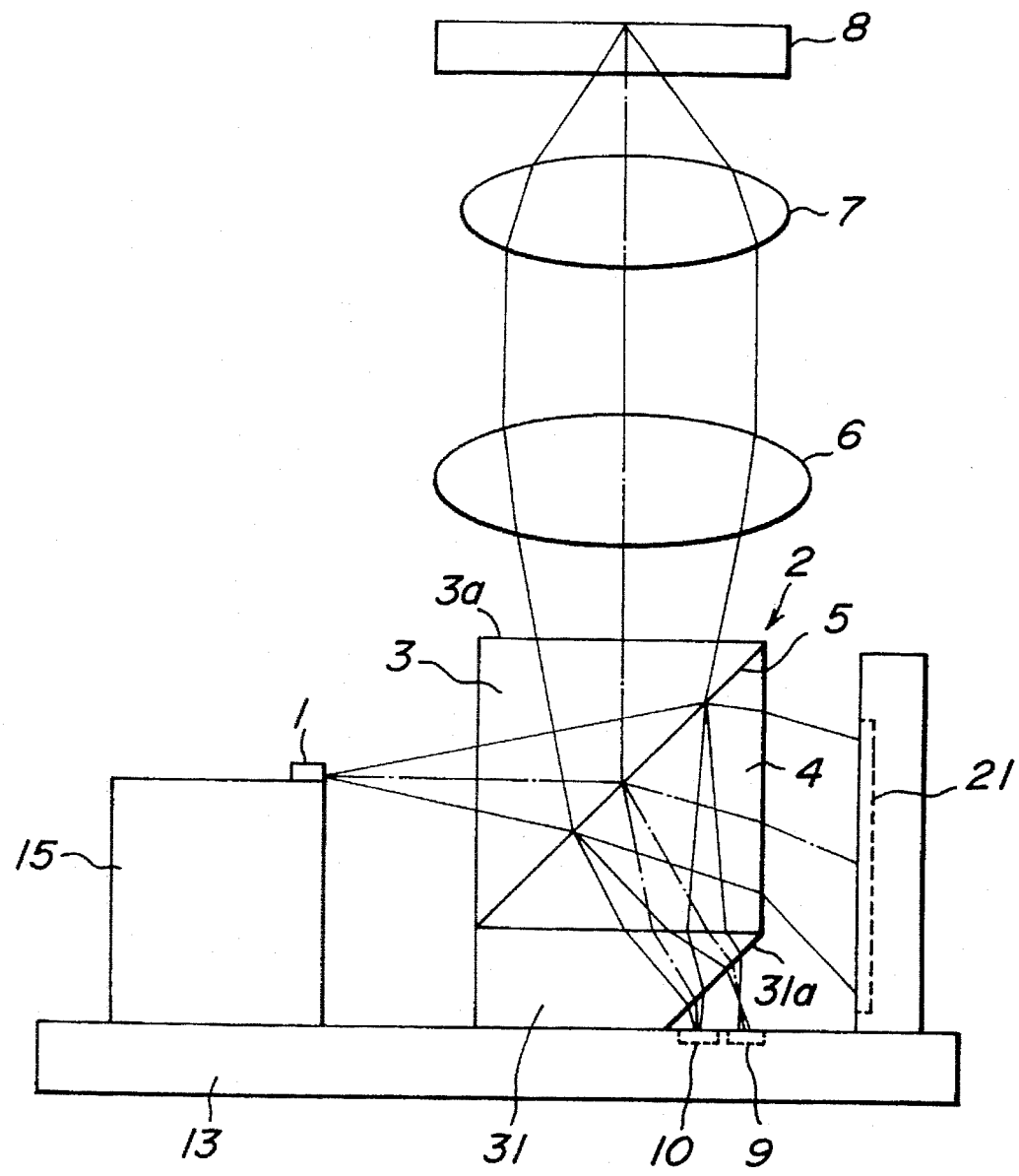
FIG. 24 is a schematic view depicting a tenth embodiment of the optical head according to the invention.

FIG. 24 is a schematic view depicting a tenth embodiment of the optical head according to the invention. The present embodiment differs from the seventh embodiment illustrated in FIG. 17 in a point that a laser beam emitted by the semiconductor laser 1, transmitted through the dielectric film 5 of the composite prism 2 and emanating from a side surface of the birefringent prism 4 is received by a third photodetector 21.

Less than 30% of the S-polarized beam incident upon the dielectric film 5 of the composite prism 2 from the side of the glass prism 3 is transmitted through the dielectric film and emanates from the side surface of the birefringent prism 4. In the present embodiment, an output signal from the third photodetector 21 represents an intensity of the laser beam emitted by the semiconductor laser 1 and thus may be used to control an output power of the semiconductor laser. The remaining construction and operation of the present embodiment are identical with those of the seventh embodiment.

Figure 25:
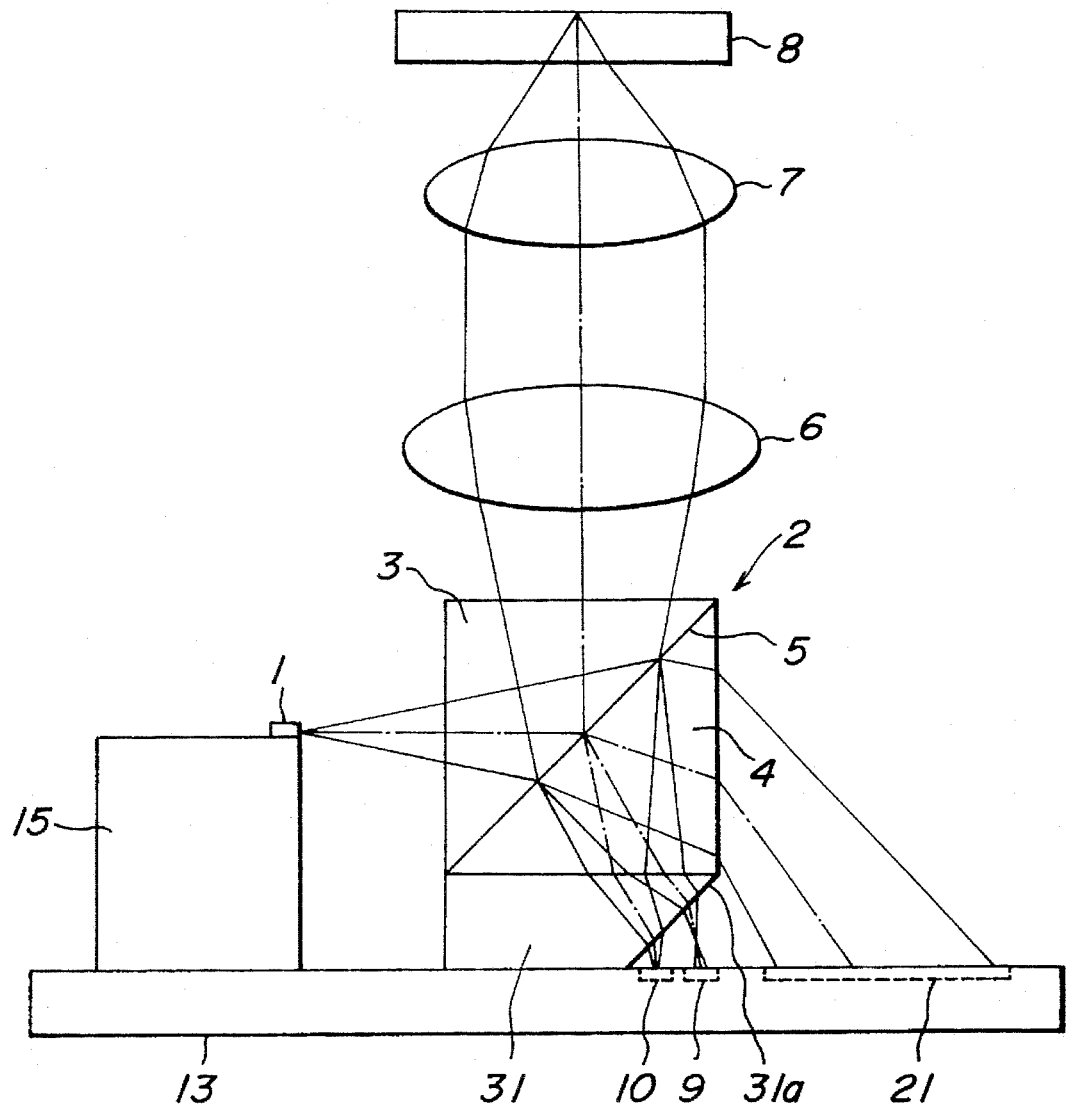
FIG. 25 is a schematic view representing an eleventh embodiment of the optical head according to the invention.

FIG. 25 is a schematic view showing an eleventh embodiment of the optical head according to the invention. In the present embodiment, the third photodetector 21 is formed in the semiconductor substrate 13 in which the first and second photodetectors 9 and 10 are formed. FIG. 26 is a plan view illustrating the first, second and third photodetectors 9, 10 and 21 of the present embodiment. The remaining construction and operation are the same as those of the tenth embodiment.

In the present embodiment the first, second and third photodetectors 9, 10 and 21 are formed in the same semiconductor substrate 13, so that the number of parts can be decreased and the optical head can be less expensive.

FIG. 27 is a plan view showing a modification of the first and second photodetectors 9 and 10 formed in the semiconductor substrate 13 of the seventh to eleventh embodiments. In this modification, each of the first and second photodetectors 9 and 10 is formed by a plurality of thin light receiving regions. Then, a positional adjustment of the photodetectors 9 and 10 with respect to the beam spots 11 and 12 can be carried out easily by selecting output signals of desired light receiving regions.

The present invention is not limited to the above mentioned embodiments, but many modifications and alternations may be conceived by those skilled in the art within the scope of the invention. It should be noted that the third photodetector 21 in the fourth and ninth embodiments illustrated in FIGS. 11 and 22 may be also provided in other embodiments. Moreover, in the above embodiments, the birefringent prisms 4 and 34 of the composite prisms 2 and 32 are made of $LiNbO_3$ (LN crystal), but it may be made of other material such as rutile ($TiO_2$), calcite, KDP, $TeO_2$ and any materials having a difference between a refractive index for the ordinary light and that for the extraordinary light is not less than 0.03. Such materials have been described in, for instance, Optical Handbook, Ose et al, Asakura Shoten, 1988, pp. 306–328. Further, the glass prisms 3 and 33 may be made of a material other than BK-7 as long as it satisfies a condition that a difference between its refractive index and at least one of refractive indices of the birefringent prism for the ordinary light and extraordinary light is not less than 0.15. It should be further noted that in the seventh to eleventh embodiments, use is made of the infinite optical system including the collimator lens 6 and objective lens 7, but in these embodiment, it is also possible to use the finite optical system by deleting the collimator lens 7.

As explained above, according to the present invention, the composite prism is constructed such that a difference between a refractive index of the birefringent prism 4 for the ordinary light and that for the extraordinary light is not less than 0.03 and a difference between the refractive index of the glass prism 3 and the refractive index of the birefringent prism 4 for at least one of ordinary light and extraordinary light is not less than 0.15. Then, a separation angle between the ordinary light and the extraordinary light emanating from the birefringent prism can be increased and a sufficiently large aberration can be introduced. Therefore, the optical head can be manufactured easily and can be small in size.

Further, by providing the aberration controlling means for increasing astigmatism in the first beam and decreasing coma in the first beam, and suppressing both astigmatism and coma of the second beam, the focusing error method suitable for the ordinary light and extraordinary light can be used to derive the focusing error signal in a stable and reliable manner. Further, the first and second photodetectors can be arranged closer to each other by providing the aberration controlling means, and thus a size of the optical head can be further reduced.

What is claimed is:

1. An optical head for a magneto-optical record medium comprising:

a semiconductor laser emitting a laser beam;

a composite prism including a glass prism, a birefringent prism and a dielectric multilayer film interposed between said glass prism and birefringent prism, said laser beam emitted by the semiconductor laser being made incident upon said glass prism and being reflected by said dielectric multilayer film;

a converging means for projecting said laser beam reflected by said dielectric multilayer film and emanating from said glass prism onto a magneto-optical record medium as a fine spot and directing a return laser beam reflected by said magneto-optical record medium to said glass prism of the composite prism as a converging beam, at least a part of the return beam impinging upon the composite prism being transmitted through said dielectric multilayer film and being made incident upon said birefringent prism in which the return beam is separated into a first ordinary beam and a second extraordinary beam; and first and second photodetectors receiving said first ordinary beam and second extraordinary beam, respectively emanating from said birefringent prism to derive output signals from which information signal, focusing error signal and tracking error signal are derived; wherein said composite prism is constructed such that a difference between refractive indices of said birefringent prism for the ordinary light and extraordinary light is not less than 0.03 and a difference between a refractive index of said glass prism and a refractive index of the birefringent prism for at least one of the ordinary light and extraordinary light is not less than 0.15.

2. An optical head according to claim 1, wherein said first and second photodetectors are arranged such that a cross sectional area of the first ordinary beam on said first photodetector is different from that of the second extraordinary beam on said second photodetector, the focusing error signal is derived by processing output signals from one of the first and second photodetectors which receives one of the first ordinary beam and second extraordinary beam having a smaller cross sectional area, and the tracking error signal is derived by processing output signals from the other photodetector.

3. An optical head according to claim 1, wherein a diffraction element is arranged between the semiconductor laser and the composite prism for dividing the laser beam emitted by the semiconductor laser into a single main beam and two sub-beams, sub-beam receiving regions are provided in at least one of the first and second photodetectors, said main beam and two sub-beams are projected onto the magneto-optical record medium such that on the record medium spots of these beams are aligned on a line which is inclined by a given angle with respect to a track direction in which information tracks extend, and the tracking error signal is derived by processing output signals from said sub-beam receiving regions in accordance with a three beam method.

4. An optical head according to claim 3, wherein optical axes of the two sub-beams are set on a plane which is obtained by rotating a plane including a normal line to the dielectric multilayer film interposed between said glass prism and the birefringent prism and an optical axis of said main beam by 30°–90° about the optical axis of the main beam.

5. An optical head according to claim 1, wherein said first and second photodetectors are formed on one and the same semiconductor substrate.

6. An optical head according to claim 1, wherein a third photodetector is provided for receiving a part of the incident laser beam which is made incident upon the glass prism, transmitted through the dielectric multilayer film and emanating from the birefringent prism.

7. An optical head according to claim 6, wherein said first, second and third photodetectors are formed on one and the same semiconductor substrate.

8. An optical head for a magneto-optical record medium comprising:

a semiconductor laser emitting a laser beam;

a composite prism including a glass prism, a birefringent prism and a dielectric multilayer film interposed between said glass prism and birefringent prism, said laser beam emitted by the semiconductor laser being made incident upon said glass prism and being reflected by said dielectric multilayer film;

a converging means for projecting said laser beam reflected by said dielectric multilayer film and emanating from said glass prism onto a magneto-optical record medium as a fine spot and directing a return laser beam reflected by said magneto-optical record medium to said glass prism of the composite prism as a converging beam, at least a part of the return beam impinging upon the composite prism being transmitted through said dielectric multilayer film and being made incident upon said birefringent prism in which the return beam is separated into first ordinary beam and second extraordinary beam;

first and second photodetectors receiving said first ordinary beam and second extraordinary beam, respectively emanating from said birefringent prism to derive output signals from which information signal, focusing error signal and tracking error signal are derived; and an aberration controlling means for increasing an astigmatism and decreasing a coma introduced in the first ordinary beam and decreasing both astigmatism and coma introduced in the second extraordinary beam.

9. An optical head according to claim 8, wherein said aberration controlling means is constructed such that a cross sectional area of the first ordinary beam on said first photodetector is substantially equal to that of the second extraordinary beam on said second photodetector.

10. An optical head according to claim 9, wherein said composite prism is constructed such that a difference between refractive indices of said birefringent prism for the ordinary light and extraordinary light is not less than 0.03 and a difference between a refractive index of said glass prism and a refractive index of the birefringent prism for at least one of the ordinary light and extraordinary light is not less than 0.15.

11. An optical head according to claim 10, wherein a diffraction element is arranged between the semiconductor laser and the composite prism for dividing the laser beam emitted by the semiconductor laser into a single main beam and two sub-beams, sub-beam receiving regions are provided in at least one of the first and second photodetectors, said main beam and two sub-beams are projected onto the magneto-optical record medium such that on the record medium spots of these beams are aligned on a line which is inclined by a given angle with respect to a track direction in which information tracks extend, and the tracking error signal is derived by processing output signals from said sub-beam receiving regions in accordance with a three beam method.

12. An optical head according to claim 10, wherein said first and second photodetectors are formed on one and the same semiconductor substrate.

13. An optical head according to claim 10, wherein a third photodetector is provided for receiving a part of the incidentlaser beam which is made incident upon the glass prism, transmitted through the dielectric multilayer film and emanating from the birefringent prism.

14. An optical head according to claim 13, wherein said first, second and third photodetectors are formed on one and the same semiconductor substrate.

15. An optical head according to claim 9, wherein said aberration controlling means is formed by a glass block having an incident surface secured to an exit surface of the birefringent prism and an exit surface from which said first ordinary beam and second extraordinary beam emanate, said exit surface being inclined with respect to a surface of said glass prism upon which said return beam is made incident.

16. An optical head according to claim 15, wherein said composite prism is constructed such that a difference between refractive indices of said birefringent prism for the ordinary light and extraordinary light is not less than 0.03 and a difference between a refractive index of said glass prism and a refractive index of the birefringent prism for at least one of the ordinary light and extraordinary light is not less than 0.15.

17. An optical head according to claim 16, wherein a diffraction element is arranged between the semiconductor laser and the composite prism for dividing the laser beam emitted by the semiconductor laser into a single main beam and two sub-beams, sub-beam receiving regions are provided in at least one of the first and second photodetectors, said main beam and two sub-beams are projected onto the magneto-optical record medium such that on the record medium spots of these beams are aligned on a line which is inclined by a given angle with respect to a track direction in which information tracks extend, and the tracking error signal is derived by processing output signals from said sub-beam receiving regions in accordance with a three beam method.

18. An optical head according to claim 16, wherein said first and second photodetectors are formed on one and the same semiconductor substrate.

19. An optical head according to claim 16, wherein a third photodetector is provided for receiving a part of the incident laser beam which is made incident upon the glass prism, transmitted through the dielectric multilayer film and emanating from the birefringent prism.

20. An optical head according to claim 19, wherein said first, second and third photodetectors are formed on one and the same semiconductor substrate.

21. An optical head according to claim 9, wherein said aberration controlling means is formed by an exit surface of said birefringent prism, said exit surface being inclined with respect to a surface of said glass prism upon which said return beam is made incident.

22. An optical head according to claim 21, wherein said composite prism is constructed such that a difference between refractive indices of said birefringent prism for the ordinary light and extraordinary light is not less than 0.03 and a difference between a refractive index of said glass prism and a refractive index of the birefringent prism for at least one of the ordinary light and extraordinary light is not less than 0.15.

23. An optical head according to claim 22, wherein a diffraction element is arranged between the semiconductor laser and the composite prism for dividing the laser beam emitted by the semiconductor laser into a single main beam and two sub-beams, sub-beam receiving regions are provided in at least one of the first and second photodetectors, said main beam and two sub-beams are projected onto the magneto-optical record medium such that on the record medium spots of these beams are aligned on a line which is inclined by a given angle with respect to a track direction in which information tracks extend, and the tracking error signal is derived by processing output signals from said sub-beam receiving regions in accordance with a three beam method.

24. An optical head according to claim 22, wherein said first and second photodetectors are formed on one and the same semiconductor substrate.

25. An optical head according to claim 22, wherein a third photodetector is provided for receiving a part of the incident laser beam which is made incident upon the glass prism, transmitted through the dielectric multilayer film and emanating from the birefringent prism.

26. An optical head according to claim 25, wherein said first, second and third photodetectors are formed on one and the same semiconductor substrate.

27. An optical head according to claim 8 wherein said composite prism is constructed such that a difference between refractive indices of said birefringent prism for the ordinary light and extraordinary light is not less than 0.03 and a difference between a refractive index of said glass prism and a refractive index of the birefringent prism for at least one of the ordinary light and extraordinary light is not less than 0.15.

28. An optical head according to claim 27, wherein a diffraction element is arranged between the semiconductor laser and the composite prism for dividing the laser beam emitted by the semiconductor laser into a single main beam and two sub-beams, sub-beam receiving regions are provided in at least one of the first and second photodetectors, said main beam and two sub-beams are projected onto the magneto-optical record medium such that on the record medium spots of these beams are aligned on a line which is inclined by a given angle with respect to a track direction in which information tracks extend, and the tracking error signal is derived by processing output signals from said sub-beam receiving regions in accordance with a three beam method.

29. An optical head according to claim 27, wherein said first and second photodetectors are formed on one and the same semiconductor substrate.

30. An optical head according to claim 27, wherein a third photodetector is provided for receiving a part of the incident laser beam which is made incident upon the glass prism, transmitted through the dielectric multilayer film and emanating from the birefringent prism.

31. An optical head according to claim 30, wherein said first, second and third photodetectors are formed on one and the same semiconductor substrate.

* * * * *